(12) United States Patent
Zhao et al.

(10) Patent No.: US 11,258,557 B2
(45) Date of Patent: Feb. 22, 2022

(54) TRANSMISSION METHOD AND DEVICE

(71) Applicant: CHINA ACADEMY OF TELECOMMUNICATIONS TECHNOLOGY, Beijing (CN)

(72) Inventors: Rui Zhao, Beijing (CN); Xueming Pan, Beijing (CN); Ying Peng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 101 days.

(21) Appl. No.: 16/496,412

(22) PCT Filed: Mar. 14, 2018

(86) PCT No.: PCT/CN2018/078996
§ 371 (c)(1),
(2) Date: Sep. 20, 2019

(87) PCT Pub. No.: WO2018/171481
PCT Pub. Date: Sep. 27, 2018

(65) Prior Publication Data
US 2020/0403747 A1 Dec. 24, 2020

(30) Foreign Application Priority Data
Mar. 23, 2017 (CN) .......................... 201710178259.9

(51) Int. Cl.
*H04L 5/00* (2006.01)
*H04W 4/40* (2018.01)
(Continued)

(52) U.S. Cl.
CPC .......... *H04L 5/0048* (2013.01); *H04L 1/0007* (2013.01); *H04L 5/0007* (2013.01); *H04W 4/40* (2018.02); *H04W 72/12* (2013.01)

(58) Field of Classification Search
CPC ...... H04J 13/0062; H04L 1/00; H04L 1/0001; H04L 1/0009; H04L 5/001; H04L 5/0012;
(Continued)

(56) References Cited

U.S. PATENT DOCUMENTS 9,077,495 B2 * 7/2015 Wang ................ H04W 72/0453
10,225,875 B2 * 3/2019 Seo .......................... H04W 8/24
(Continued)

FOREIGN PATENT DOCUMENTS

AU  2017237795 A1 * 8/2018 ............ H04W 76/14
BR  112018068963 A2 * 1/2019 ........... H04L 1/0001
(Continued)

OTHER PUBLICATIONS

International Search Report from PCT/CN2018/078996, dated May 29, 2018, with English translation from WIPO.
(Continued)

*Primary Examiner* — Eric Nowlin
(74) *Attorney, Agent, or Firm* — Ladas & Parry, LLP

(57) ABSTRACT

The present disclosure provides a transmission method and a transmission device. The transmission method includes: determining, by a transmitting end device, first SA information and first data to be transmitted, the first SA information at least including indication information about a DMRS sequence for the demodulation of the first data; and transmitting, by the transmitting end device, the first SA information in a first physical layer format and transmitting the first data in a second physical layer format.

18 Claims, 11 Drawing Sheets

(51) Int. Cl.
*H04L 1/00* (2006.01)
*H04W 72/12* (2009.01)

(58) Field of Classification Search
CPC ... H04L 5/0044; H04L 5/0048; H04L 5/0051; H04L 5/0055; H04L 5/0069; H04L 67/12; H04W 4/021; H04W 4/027; H04W 4/46; H04W 72/02; H04W 72/048; H04W 72/12; H04W 76/14
See application file for complete search history.

(56) References Cited

U.S. PATENT DOCUMENTS

| | | | |
|---|---|---|---|
| 10,542,464 B2 * | 1/2020 | Narasimha | H04W 36/0027 |
| 10,595,309 B2 * | 3/2020 | He | H04L 5/0053 |
| 10,602,498 B2 * | 3/2020 | Huang | H04L 5/0053 |
| 10,742,466 B2 * | 8/2020 | Wang | H04W 72/1205 |
| 10,743,336 B2 * | 8/2020 | Blasco Serrano | H04W 72/1278 |
| 10,791,549 B2 * | 9/2020 | Shimezawa | H04L 5/0094 |
| 10,880,910 B2 * | 12/2020 | Kwak | H04W 72/1263 |
| 10,897,761 B2 * | 1/2021 | Gao | H04W 72/12 |
| 10,897,765 B2 * | 1/2021 | Hosseini | H04L 5/0094 |
| 11,039,435 B2 * | 6/2021 | Au | H04W 28/0205 |
| 11,063,736 B2 * | 7/2021 | Takeda | H04L 1/1812 |
| 2012/0188937 A1 * | 7/2012 | Wang | H04L 5/0048 370/315 |
| 2015/0188650 A1 * | 7/2015 | Au | H04L 5/0094 370/312 |
| 2015/0270939 A1 * | 9/2015 | Ro | H04L 27/2613 370/329 |
| 2015/0327288 A1 * | 11/2015 | Park | H04W 52/04 370/329 |
| 2015/0334686 A1 * | 11/2015 | Ji | H04L 5/1469 370/280 |
| 2016/0037572 A1 * | 2/2016 | Yeh | H04W 72/0406 370/329 |
| 2016/0183276 A1 * | 6/2016 | Marinier | H04W 72/04 370/329 |
| 2016/0249355 A1 | 8/2016 | Chae et al. | |
| 2016/0345311 A1 * | 11/2016 | Chen | H04W 72/0446 |
| 2016/0381490 A1 * | 12/2016 | Rico Alvarino | H04L 5/0048 370/330 |
| 2016/0381666 A1 | 12/2016 | Kim et al. | |
| 2017/0202043 A1 * | 7/2017 | Seo | H04W 76/14 |
| 2017/0273128 A1 * | 9/2017 | Abedini | H04L 5/0069 |
| 2017/0290008 A1 * | 10/2017 | Tooher | H04L 1/1893 |
| 2017/0303171 A1 * | 10/2017 | Jonsson | H04L 5/0005 |
| 2018/0007529 A1 * | 1/2018 | Shin | H04J 11/00 |
| 2018/0132211 A1 * | 5/2018 | Huang | H04L 5/0094 |
| 2018/0176973 A1 * | 6/2018 | Kim | H04W 72/04 |
| 2018/0288771 A1 * | 10/2018 | Hosseini | H04W 72/042 |
| 2018/0288792 A1 * | 10/2018 | Blasco Serrano | H04L 5/0053 |
| 2018/0324778 A1 * | 11/2018 | Farajidana | H04W 72/0446 |
| 2018/0324797 A1 * | 11/2018 | Hosseini | H04W 72/0446 |
| 2018/0332602 A1 | 11/2018 | Lee et al. | |
| 2018/0332605 A1 * | 11/2018 | Pelletier | H04W 72/1242 |
| 2018/0359745 A1 * | 12/2018 | Yeo | H04L 5/0048 |
| 2019/0036676 A1 * | 1/2019 | Takeda | H04W 72/04 |
| 2019/0037563 A1 * | 1/2019 | Lyu | H04L 5/0053 |
| 2019/0090236 A1 * | 3/2019 | Au | H04W 72/042 |
| 2019/0098611 A1 * | 3/2019 | Shimezawa | H04L 5/0044 |
| 2019/0104006 A1 * | 4/2019 | Wang | H04L 5/005 |
| 2019/0141679 A1 * | 5/2019 | He | H04L 5/0007 |
| 2019/0182840 A1 * | 6/2019 | Feng | H04W 4/44 |
| 2019/0260540 A1 * | 8/2019 | Blasco | H04L 5/0053 |
| 2020/0322024 A1 * | 10/2020 | Cheng | H04L 25/0226 |
| 2020/0328850 A1 * | 10/2020 | Feng | H04L 1/1812 |
| 2020/0336352 A1 * | 10/2020 | Wang | H04L 27/26 |
| 2020/0403747 A1 * | 12/2020 | Zhao | H04L 5/0048 |
| 2020/0413380 A1 * | 12/2020 | Shimezawa | H04W 72/042 |
| 2021/0051627 A1 * | 2/2021 | Lee | H04L 5/0044 |

FOREIGN PATENT DOCUMENTS

| | | | | |
|---|---|---|---|---|
| CN | 102256352 A | | 11/2011 | |
| CN | 105101392 A | | 11/2015 | |
| CN | 105323855 A | | 2/2016 | |
| CN | 105490793 A | | 4/2016 | |
| CN | 106063352 A | | 10/2016 | |
| CN | 106470387 A | | 3/2017 | |
| CN | 108834433 A | * | 11/2018 | ............ H04L 5/0012 |
| CN | 109076535 A | * | 12/2018 | ............ H04L 5/0053 |
| CN | 111641475 A | * | 9/2020 | ............ H04L 1/1854 |
| EP | 2863664 A1 | * | 4/2015 | ............ H04W 24/10 |
| EP | 2863664 A4 | * | 6/2016 | ............ H04B 7/0626 |
| EP | 3195508 A1 | * | 7/2017 | ............ H04W 52/146 |
| EP | 2863664 B1 | * | 10/2018 | ............ H04W 24/10 |
| EP | 3434030 A1 | * | 1/2019 | ............ H04L 1/00 |
| EP | 3424236 A4 | * | 3/2019 | ........ H04W 36/0027 |
| EP | 3457784 A1 | * | 3/2019 | ............ H04L 5/0044 |
| EP | 3457784 A4 | * | 5/2019 | ............ H04L 5/0044 |
| EP | 3606104 A1 | | 2/2020 | |
| JP | 6805541 B2 | * | 12/2020 | ........ H04W 72/042 |
| KR | 20170076845 A | * | 7/2017 | |
| WO | WO-2016040290 A1 | * | 3/2016 | ............ H04L 1/0078 |
| WO | 2016204592 A1 | | 12/2016 | |
| WO | WO-2017099369 A1 | * | 6/2017 | ........ H04W 72/0446 |
| WO | WO-2017165097 A1 | * | 9/2017 | ............. H04L 67/12 |
| WO | WO-2020200079 A1 | * | 10/2020 | ............ H04W 24/10 |

OTHER PUBLICATIONS

Written Opinion from the International Searching Authority from PCT/CN2018/078996, dated May 29, 2018, with English translation from WIPO.
International Preliminary Report on Patentability from PCT/CN2018/078996, dated Sep. 24, 2019, with English translation from WIPO.
First Office Action from CN app. No. 201710178259.9, dated Jan. 21, 2020, with English translation from Global Dossier.
Extended European Search Report from EP app. No. 18771514.9, dated Mar. 6, 2020.
"Introduction of standard and technology of LTE-V in 3GPP", Li et al., Jun. 2016.
"Discussion on shorten TTI in V2X phase 2", R1-1704530, 3GPP TSG RAN WG1 Meeting #88bis, Spokane, USA, Apr. 3-7, 2017.

* cited by examiner

TRANSMISSION METHOD AND DEVICE

CROSS-REFERENCE TO RELATED APPLICATIONS

The present application is the U.S. national phase of PCT/CN2018/078996 filed on Mar. 14, 2018 which claims priority to the Chinese patent application No. 201710178259.9 filed on Mar. 23, 2017, the disclosures of which are incorporated by reference herein in their entireties.

TECHNICAL FIELD

The present disclosure relates to the field of communication technology, in particular to a transmission method used between User Equipments (UEs) for Internet of Vehicles, and a transmission device.

BACKGROUND

In a conventional Long Term Evolution (LTE) Rel-14 Vehicle to Everything (V2X) technique, a granularity in time for a resource occupied by data transmission is an LTE normal subframe (1 ms). Due to the progress of the V2X technique, it is necessary to support a shorter processing delay and provide higher reliability, so a shorter subframe length, e.g., an Orthogonal Frequency Division Multiplexing (OFDM) symbol-level or a slot (0.5 ms, i.e., a half subframe)-level subframe length, needs to be introduced.

In the conventional LTE Rel-14 V2X technique, a legacy UE needs to determine whether a data resource indicated by currently-received legacy Scheduling Assignment (SA) information is an occupied state in a joint manner in accordance with the received SA information and the measurement of Reference Signal Receiving Power (RSRP) of a Demodulation Reference Signal (DMRS) for the data source indicated by the SA information. When the RSRP of the DMRS is greater than an RSRP threshold configured or preconfigured by a system, it is determined that the current resource is to be occupied within a next reservation period. The predetermined period is carried in the SA information, and an indication of a DMRS sequence is determined in accordance with a Cyclic Redundancy Check (CRC) bit in the SA information.

Because the granularity in time for the resource occupied by the data transmission is the LTE normal subframe (1 ms) in the conventional LTE Rel-14 V2X technique, the data transmission reliability is relatively low and the transmission delay is relatively large.

SUMMARY

An object of the present disclosure is to provide a transmission method and a transmission device, so as to improve the data transmission reliability and reduce the transmission delay.

In one aspect, the present disclosure provides in some embodiments a transmission method, including: determining, by a transmitting end device, first SA information and first data to be transmitted, the first SA information at least including indication information about a DMRS sequence for the demodulation of the first data; and transmitting, by the transmitting end device, the first SA information in a first physical layer format and transmitting the first data in a second physical layer format.

In some possible embodiments of the present disclosure, the transmission method further includes transmitting, by the transmitting end device, second SA information in a third physical layer format when transmitting the first SA information in the first physical layer format and transmitting the first data in the second physical layer format.

In some possible embodiments of the present disclosure, the transmission method further includes determining, by the transmitting end device, whether the second SA information needs to be transmitted in the third physical layer format in accordance with a network configuration or a pre-configuration when transmitting the first SA information in the first physical layer format and transmitting the first data in the second physical layer format.

In some possible embodiments of the present disclosure, when the transmitting end device transmits the first SA information in the first physical layer format, transmits the first data in the second physical layer format and transmits the second SA information in the third physical layer format, a time-frequency resource occupied by the first SA information is included in a set of time-frequency resources for second data indicated in the second SA information.

In some possible embodiments of the present disclosure, a frequency-domain resource occupied by the first SA information is located at a head or a tail of frequency-domain resources for the second data indicated in the second SA information.

In some possible embodiments of the present disclosure, when the transmitting end device transmits the first SA information in the first physical layer format, transmits the first data in the second physical layer format and transmits the second SA information in the third physical layer format, a time-frequency resource occupied by the first SA information and a time-frequency resource occupied by the first data indicated in the first SA information are both included in a set of time-frequency resources of the second data indicated in the second SA information.

In some possible embodiments of the present disclosure, the first SA information further includes one or more of a Modulation and Coding Scheme (MCS) for the first data transmitted in the second physical layer format, indication information about a time-frequency resource of the first data, indication information about a redundancy version, indication information about a resource reservation period, and indication information about a service priority.

In some possible embodiments of the present disclosure, the indication information about the DMRS sequence includes information about a DMRS initialization Identity (ID), and/or indication information about a DMRS cyclic shift value.

In some possible embodiments of the present disclosure, when the transmitting end device transmits the first SA information in the first physical layer format, transmits the first data in the second physical layer format and transmits the second SA information in the third physical layer format, a DMRS sequence generated by the indication information about the DMRS sequence carried in the first SA information is the same as a DMRS sequence generated by the indication information about the DRMS sequence carried in the second SA information.

In some possible embodiments of the present disclosure, when the transmitting end device transmits the first SA information in the first physical layer format, transmits the first data in the second physical layer format and transmits the second SA information in the third physical layer format, a position of a time-frequency resource occupied by a DMRS sequence associated with the first data transmitted in the second physical layer format is the same as a position of a time-frequency resource occupied by a DMRS sequence associated with the first data determined in accordance with the third physical layer format.

In some possible embodiments of the present disclosure, when the transmitting end device transmits the first SA information in the first physical layer format, transmits the first data in the second physical layer format and transmits the second SA information in the third physical layer format, a DMRS sequence associated with the first data transmitted in the second physical layer format is the same as a DMRS sequence associated with the first data determined in accordance with the third physical layer format.

In some possible embodiments of the present disclosure, when the transmitting end device transmits the first SA information in the first physical layer format, transmits the first data in the second physical layer format and transmits the second SA information in the third physical layer format, and the time-frequency resource occupied by the first SA information is included in the set of the time-frequency resources of the second data indicated in the second SA information, the DMRS sequence for a portion overlapping the time-frequency resource occupied by the first SA information is processed through a punching process to remove redundant bits.

In some possible embodiments of the present disclosure, the transmission method further includes generating, by the transmitting end device, a DMRS sequence transmitted in the second physical layer format in accordance with the indication information about the DMRS sequence in the first SA information.

In some possible embodiments of the present disclosure, a length of the DMRS sequence transmitted in the second physical layer format is determined in accordance with the first SA information and the time-frequency resource occupied by the first data transmitted in the second physical layer format. The DMRS sequence for a portion overlapping the time-frequency resource occupied by the first SA information is processed through a punching process to remove redundant bits.

In another aspect, the present disclosure provides in some embodiments a transmission method, including: receiving, by a receiving end device, first SA information transmitted by a transmitting end device in a first physical layer format and first data transmitted by the transmitting end device in a second physical layer format, the first SA information at least including indication information about a DMRS sequence for the demodulation of the first data; and acquiring, by the receiving end device, the indication information about the DMRS sequence through detecting the first SA information, and demodulating the first data.

In some possible embodiments of the present disclosure, the transmission method further includes receiving second SA information transmitted by the transmitting end device in a third physical layer format when receiving the first SA information transmitted by the transmitting end device in the first physical layer format and receiving the first data transmitted by the transmitting end device in the second physical layer format.

In some possible embodiments of the present disclosure, a time-frequency resource occupied by the first SA information is included in a set of time-frequency resources for second data indicated in the second SA information.

In some possible embodiments of the present disclosure, a frequency-domain resource occupied by the first SA information is located at a head or a tail of frequency-domain resources for the second data indicated in the second SA information.

In some possible embodiments of the present disclosure, the first SA information further includes one or more of an MCS for the first data transmitted in the second physical layer format, indication information about a time-frequency resource of the first data, indication information about a redundancy version, indication information about a resource reservation period, and indication information about a service priority.

In some possible embodiments of the present disclosure, the indication information about the DMRS sequence includes information about a DMRS initialization ID, and/or indication information about a DMRS cyclic shift value.

In some possible embodiments of the present disclosure, a DMRS sequence generated by the indication information about the DMRS sequence carried in the first SA information is the same as a DMRS sequence generated by the indication information about the DRMS sequence carried in the second SA information.

In yet another aspect, the present disclosure provides in some embodiments a transmission device, including: a determination module configured to determine first SA information and first data to be transmitted, the first SA information at least including indication information about a DMRS sequence for the demodulation of the first data; and a first transmission module configured to transmit the first SA information in a first physical layer format and transmit the first data in a second physical layer format.

In some possible embodiments of the present disclosure, the transmission device further includes a second transmission module configured to transmit second SA information in a third physical layer format when transmitting the first SA information in the first physical layer format and transmitting the first data in the second physical layer format.

In some possible embodiments of the present disclosure, the transmission device further includes a judgment module configured to determine whether the second SA information needs to be transmitted in the third physical layer format in accordance with a network configuration or a pre-configuration when transmitting the first SA information in the first physical layer format and transmitting the first data in the second physical layer format.

In some possible embodiments of the present disclosure, a time-frequency resource occupied by the first SA information is included in a set of time-frequency resources for second data indicated in the second SA information.

In some possible embodiments of the present disclosure, a frequency-domain resource occupied by the first SA information is located at a head or a tail of frequency-domain resources for the second data indicated in the second SA information.

In some possible embodiments of the present disclosure, a time-frequency resource occupied by the first SA information and a time-frequency resource occupied by the first data indicated in the first SA information are both included in a set of time-frequency resources of the second data indicated in the second SA information.

In some possible embodiments of the present disclosure, the first SA information further includes one or more of an MCS for the first data transmitted in the second physical layer format, indication information about a time-frequency resource of the first data, indication information about a redundancy version, indication information about a resource reservation period, and indication information about a service priority.

In some possible embodiments of the present disclosure, the indication information about the DMRS sequence includes information about a DMRS initialization ID, and/or indication information about a DMRS cyclic shift value.

In some possible embodiments of the present disclosure, a DMRS sequence generated by the indication information about the DMRS sequence carried in the first SA information is the same as a DMRS sequence generated by the indication information about the DRMS sequence carried in the second SA information.

In some possible embodiments of the present disclosure, a position of a time-frequency resource occupied by a DMRS sequence associated with the first data transmitted in the second physical layer format is the same as a position of a time-frequency resource occupied by a DMRS sequence associated with the first data determined in accordance with the third physical layer format.

In some possible embodiments of the present disclosure, a DMRS sequence associated with the first data transmitted in the second physical layer format is the same as a DMRS sequence associated with the first data determined in accordance with the third physical layer format.

In some possible embodiments of the present disclosure, the DMRS sequence for a portion overlapping the time-frequency resource occupied by the first SA information is processed through a punching process to remove redundant bits.

In some possible embodiments of the present disclosure, the transmission device further includes a generation module configured to generate a DMRS sequence transmitted in the second physical layer format in accordance with the indication information about the DMRS sequence in the first SA information.

In some possible embodiments of the present disclosure, a length of the DMRS sequence transmitted in the second physical layer format is determined in accordance with the first SA information and the time-frequency resource occupied by the first data transmitted in the second physical layer format. The DMRS sequence for a portion overlapping the time-frequency resource occupied by the first SA information is processed through a punching process to remove redundant bits.

In still yet another aspect, the present disclosure provides in some embodiments a transmission device, including: a first reception module configured to receive first SA information transmitted by a transmitting end device in a first physical layer format and first data transmitted by the transmitting end device in a second physical layer format, the first SA information at least including indication information about a DMRS sequence for the demodulation of the first data; and a demodulation module configured to acquire the indication information about the DMRS sequence through detecting the first SA information, and demodulate the first data.

In some possible embodiments of the present disclosure, the transmission device further includes a second reception module configured to receive second SA information transmitted by the transmitting end device in a third physical layer format when the first reception module receives the first SA information transmitted by the transmitting end device in the first physical layer format and receives the first data transmitted by the transmitting end device in the second physical layer format.

In some possible embodiments of the present disclosure, a time-frequency resource occupied by the first SA information is included in a set of time-frequency resources for second data indicated in the second SA information.

In some possible embodiments of the present disclosure, a frequency-domain resource occupied by the first SA information is located at a head or a tail of frequency-domain resources for the second data indicated in the second SA information.

In some possible embodiments of the present disclosure, the first SA information further includes one or more of an MCS for the first data transmitted in the second physical layer format, indication information about a time-frequency resource of the first data, indication information about a redundancy version, indication information about a resource reservation period, and indication information about a service priority.

In some possible embodiments of the present disclosure, the indication information about the DMRS sequence includes information about a DMRS initialization ID, and/or indication information about a DMRS cyclic shift value.

In some possible embodiments of the present disclosure, a DMRS sequence generated by the indication information about the DMRS sequence carried in the first SA information is the same as a DMRS sequence generated by the indication information about the DRMS sequence carried in the second SA information.

In still yet another aspect, the present disclosure provides in some embodiments a transmitting end device, including a processor, a memory, and a computer program stored in the memory and executed by the processor. The processor is configured to execute the computer program so as to implement the above-mentioned transmission method.

In still yet another aspect, the present disclosure provides in some embodiments a receiving end device, including a processor, a memory, and a computer program stored in the memory and executed by the processor. The processor is configured to execute the computer program so as to implement the above-mentioned transmission method.

In still yet another aspect, the present disclosure provides in some embodiments a computer-readable storage medium storing therein a computer program. The computer program is executed by a processor so as to implement the above-mentioned transmission method.

In still yet another aspect, the present disclosure provides in some embodiments a computer-readable storage medium storing therein a computer program. The computer program is executed by a processor so as to implement the above-mentioned transmission method.

According to the embodiments of the present disclosure, the first SA information transmitted by the transmitting end device may at least include the indication information about the DMRS sequence for the demodulation of the first data, so the receiving end device is capable of demodulating the first data in accordance with the indication information. The first physical layer format for transmitting the first SA information and the second physical layer format for transmitting the first data may each be a transmission format supporting a shorter subframe length (a subframe length smaller than 1 ms), e.g., a transmission format with a slot-level Transmission Time Interval (TTI) or an OFDM symbol-level TTI, so it is able to improve the data transmission reliability and reduce the transmission delay effectively.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In an LTE Rel-14 V2X technique, a UE is provided with two channels for the transmission of data, i.e., a Physical Sidelink Control Channel (PSCCH) for the transmission of SA information, and a Physical Sidelink Shared Channel (PSSCH) for the transmission of data information. At first, a receiving end device detects the SA information carried in the control channel, and then receives the data information in accordance with the received SA information.

In the LTE Rel-14 V2X technique, there are the following two resource selection modes.

Figure 1A:
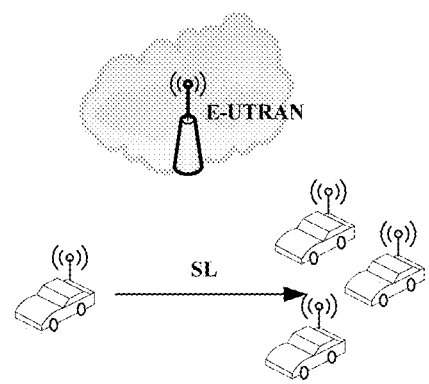
FIGS. 1A and 1B are schematic views showing communications between vehicles in the related art.

1) Resource selection mode initiated by the UE itself: as shown in FIG. 1A, the UE may select a transmission resource on its own initiative from a V2X resource pool configured by a system or a preconfigured V2X resource pool in accordance with a sensing method.

Figure 1B:
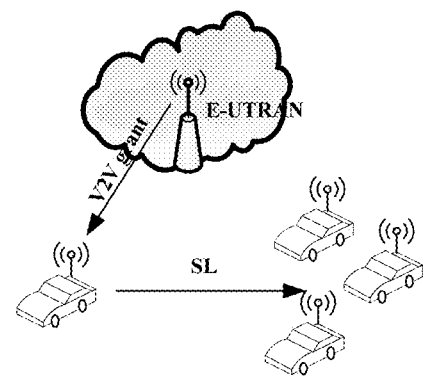

2) Resource selection mode aided by a base station: when vehicles are located within a network coverage, the base station may schedule vehicle-to-vehicle (V2V) communication through a Physical Downlink Control Channel (PDCCH)/Enhanced Physical Downlink Control Channel (EPDCCH), as shown in FIG. 1B. In this case, the base station may transmit a V2V grant message, so as to indicate a vehicle to transmit positions of resources for the SA and the data.

In the LTE Rel-14 V2V technique, SA for a same user and the data associated with the SA may be transmitted within a same subframe, and two frequency-division multiplexing (FDM) transmission modes for the SA and the data have been presented.

Figure 2A:
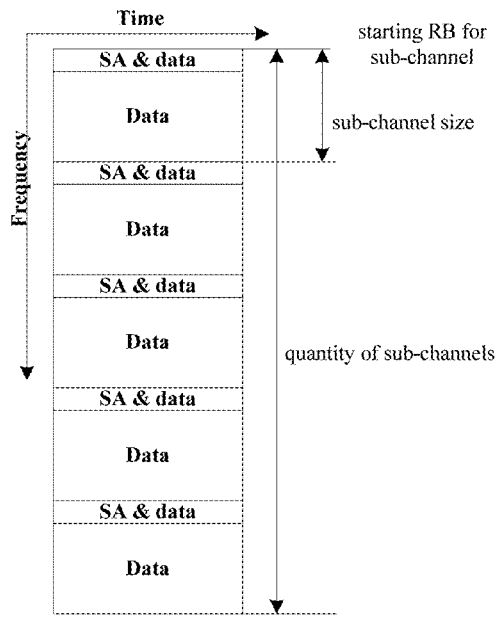
FIGS. 2A and 2B are schematic views showing the configuration of frequency-domain resources for SA and data in the related art.

1) The SA and the data for the same user may be transmitted in an inter-frequency manner, and FIG. 2A shows a resource configuration in a frequency domain.

Figure 2B:
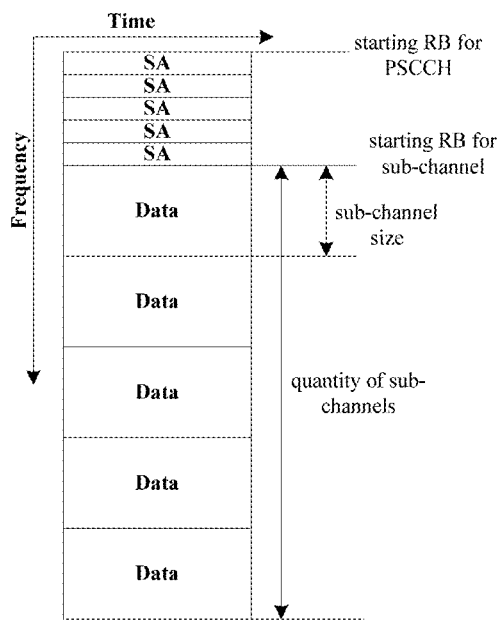

2) The SA and the data for the same user may be transmitted in a non-inter-frequency manner, and FIG. 2B shows a resource configuration in the frequency domain. As shown in FIG. 2B, positions of SA channel resources correspond to starting positions of sub-channels occupied by the data respectively.

In these two cases, each SA channel resource may include two Physical Resource Blocks (PRBs) in the frequency domain, and a plurality of sub-channels may be scheduled by each piece of SA information for the data transmission.

Figure 3:
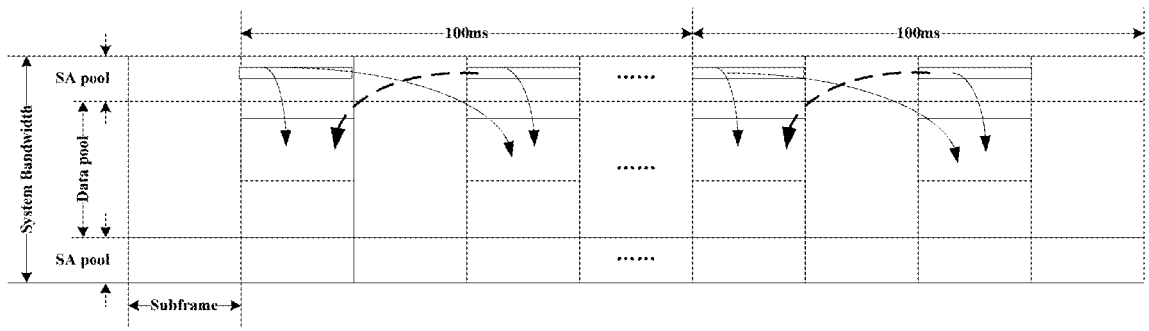
FIG. 3 is a schematic view showing data transmission in the related art.

One data packet may be transmitted not more than twice (a transmission time may be configured as one or two). When one data packet has been transmitted twice, one transmission may be initial transmission of the data packet, and the other may be retransmission of the data packet. Indication information about the resources for two transmission procedures may be carried in the SA information associated with the initially-transmitted data and the SA information associated with the retransmitted data, as shown in FIG. 3. When the SA information associated with the initially-transmitted data has been received erroneously and the SA information associated with the retransmitted data has been received correctly, the UE may not be required to detect the initially-transmitted data in accordance with the indication information about the resources for the initially-transmitted data included in the SA information corresponding to the retransmitted data.

During the reception, the UE needs to perform blind detection on the positions of the SA channel resources at first, so as to receive the SA information. Upon the receipt of the SA information, the UE may determine a corresponding resource for the data transmission and a corresponding MCS in accordance with the indication information in the SA information, so as to detect the data.

The SA information may include the following information: (1) a priority level (e.g., eight types of priority levels) having a length of 3 bits; (2) a resource reservation period having a length of 4 bits, which is used to represent a reservation period for the resource, i.e., a resource indicated by the current SA information is to be used again within a next reservation period; (3) a position of frequency-domain resources for the other transmission (starting position/length) having a length smaller than or equal to 8 bits, which is used to indicate the frequency-domain resources occupied by the data indicated by the current SA information for the initial transmission and the retransmission; (4) a time interval for the initial transmission/retransmission having a length of 4 bits (when there is merely one transmission procedure, all bits in the current SA information are set as 0); (5) an MCS having a length of 5 bits; (6) a retransmission indicator having a length of 1 bit, which is used to indicate the data associated with the current SA information is initially transmitted or retransmitted; and (7) reserved/padding bits having a length of greater than or equal to 7 bits.

When the resource selection is performed by one UE (UE1), the UE1 needs to perform DMRS RSRP measurement on the resources occupied by the data for a UE2 in accordance with SA information from the UE2 and indication information about the resources for the data indicated by the SA information from the UE2. When RSRP of a DMRS for the UE2 is greater than a configured or preconfigured RSRP threshold, it means that the resource for the data transmission for the UE2 has been reserved. At this time, during the resource selection, the UE1 may select the resources in accordance with the indication information about the reservation period carried in the SA information from the UE2, so as to prevent any conflict with the resources occupied by the UE2.

Figure 4:
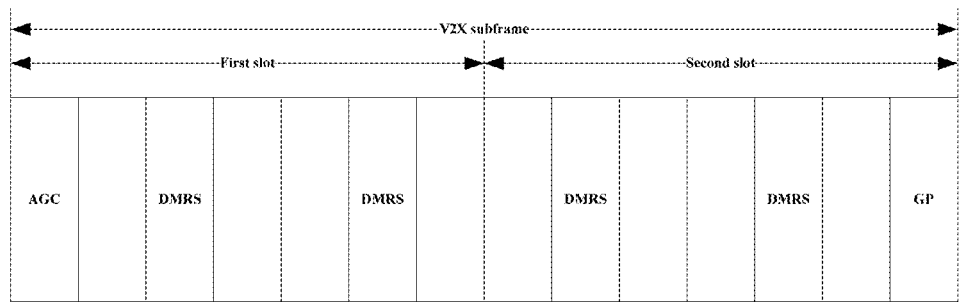
FIG. 4 is a schematic view showing a subframe structure in LTE Rel-14 V2X.

FIG. 4 shows a subframe structure in the LTE Rel-14 V2X technique. Each subframe may include four pilot symbols and one Guard Period (GP). In addition, a first OFDM symbol may be used for the adjustment of Automatic Gain Control (AGC).

In the LTE Rel-14 V2X technique, DMRSs for the SA information and the data are mainly generated as follows.

A DMRS sequence for the SA information may have a predefined initialization ID, and use one cyclic shift value randomly selected from four predefined cyclic shift values {0, 3, 6, 9}. When receiving the SA information, a receiving end device needs to perform blind detection on the cyclic shift value for the DMRS used by the SA information. The DMRS sequences on OFDM symbols for different DMRSs may be the same.

A DMRS initialization ID and a cyclic shift value of a DMRS sequence for the data may both be generated in accordance with an ID value (N_ID) acquired from a CRC bit of the SA information, and the DMRS sequences on the OFDM symbols for different DMRSs may be the same or different from each other. When N_ID mod 2=0, the DMRS sequences may be the same. When N_ID mod 2=1, the DMRS sequences may be different from each other, and they may be extended through [1, −1, 1, −1]. The receiving end device may completely reconstruct the entire DMRS sequence for the data transmission in accordance with the received SA information.

Figure 5:
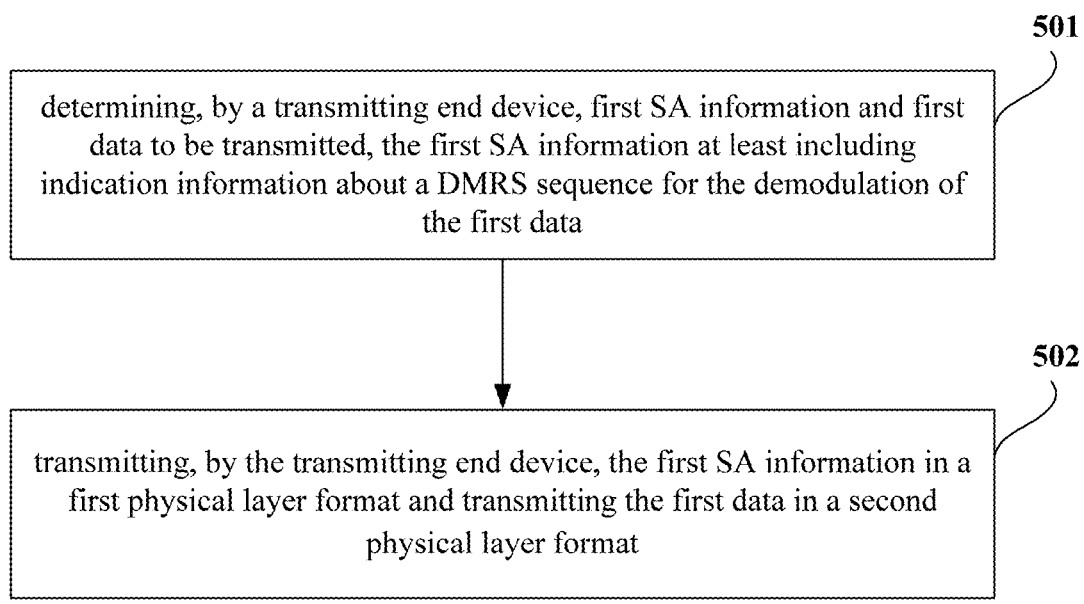
FIG. 5 is a flow chart of a transmission method according to some embodiments of the present disclosure.

The present disclosure provides in some embodiments a transmission method which, as shown in FIG. 5, includes Step 501 and Step 502. However, it should be appreciated that, the transmission method may not be limited to these two steps.

Step 501: determining, by a transmitting end device, first SA information and first data to be transmitted, the first SA information at least including indication information about a DMRS sequence for the demodulation of the first data.

The transmitting end device may be a V2X transmitting end device which supports a communication protocol with a version greater than LTE Rel-14, e.g., LTE Rel-15.

The first SA information may be any SA information adapted to a communication protocol with a version higher than LTE Rel-14, and it may also be called as new SA information.

Step 502: transmitting, by the transmitting end device, the first SA information in a first physical layer format and transmitting the first data in a second physical layer format.

It should be appreciated that, the first physical layer format and the second physical layer format may be a same transmission format or different transmission formats. The physical layer formats may be differentiated from each other in accordance with a length of a subframe (e.g., a conventional V2X subframe, a slot-level short subframe or an OFDM symbol-level short subframe), and/or in accordance with different multi-antenna transmission modes (e.g., a single-antenna transmission mode, a multi-antenna multi-port transmission diversity mode, a multi-antenna single-port transmission diversity mode, and a multi-antenna multi-port spatial multiplexing mode).

The first physical layer format may have a same subframe length as, and a same multi-antenna transmission mode as or a different multi-antenna transmission mode from the second physical layer. In the embodiments of the present disclosure, a short subframe structure is mainly taken as an example, e.g., the first physical layer format and the second physical layer format may each be a transmission format with a subframe smaller than 1 ms.

In the case of a short subframe, the first physical layer format and the second physical layer format may each be, but not limited to, a slot-level TTI transmission format, or an OFDM-level TTI transmission format.

In the embodiments of the present disclosure, the first SA information may further include one or more of an MCS for the first data transmitted in the second physical layer format, indication information about a time-frequency resource of the first data, indication information about a redundancy version, indication information about a resource reservation period, and indication information about a service priority.

In some possible embodiments of the present disclosure, the transmission method may further include generating, by the transmitting end device, a DMRS sequence transmitted in the second physical layer format in accordance with indication information about the DMRS sequence in the first SA information. For example, a length of the DMRS sequence transmitted in the second physical layer format may be determined in accordance with the first SA information and a time-frequency resource occupied by the first data transmitted in the second physical layer format. The DMRS sequence for a portion overlapping a time-frequency resource occupied by the first SA information may be processed through a punching process to remove redundant bits.

According to the embodiments of the present disclosure, the first SA information transmitted by the transmitting end device may at least include the indication information about the DMRS sequence for the demodulation of the first data, so a receiving end device is capable of demodulating the first data in accordance with the indication information. The first physical layer format for transmitting the first SA information and the second physical layer format for transmitting the first data may each be a transmission format supporting a shorter subframe length, e.g., a transmission format with a slot-level Transmission Time Interval (TTI) or an OFDM symbol-level TTI, so it is able to be adapted to an evolved V2X technique with a shorter processing delay and higher reliability.

Figure 6:
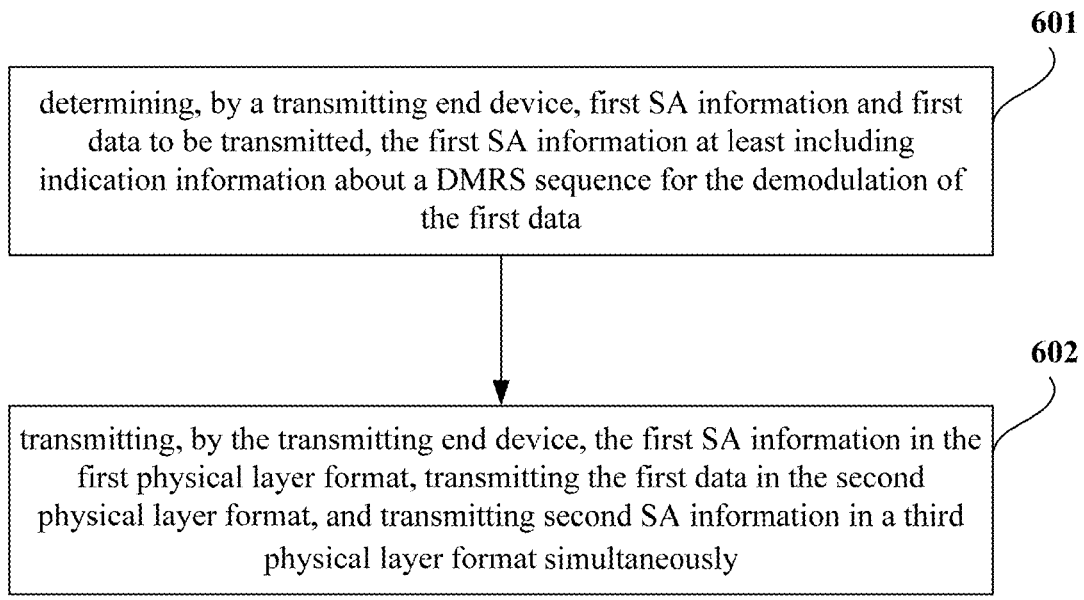
FIG. 6 is another flow chart of the transmission method according to some embodiments of the present disclosure.

The present disclosure further provides in some embodiments a transmission method which, as shown in FIG. 6, includes Step 601 and Step 602. However, it should be appreciated that, the transmission method may not be limited to these two steps.

Step 601: determining, by a transmitting end device, first SA information and first data to be transmitted, the first SA information at least including indication information about a DMRS sequence for the demodulation of the first data.

A communication protocol supported by the transmitting end device may be provided with a version greater than LTE Rel-14, e.g., LTE Rel-15.

The first SA information may be any SA information adapted to a communication protocol with a version higher than LTE Rel-14, and it may also be called as new SA information.

Step 602: transmitting, by the transmitting end device, the first SA information in the first physical layer format, transmitting the first data in the second physical layer format, and transmitting second SA information in a third physical layer format.

It should be appreciated that, the first physical layer format and the second physical layer format may be a same transmission format or different transmission formats. The physical layer formats may be differentiated from each other in accordance with a length of a subframe (e.g., a conventional V2X subframe, a slot-level short subframe or an OFDM symbol-level short subframe), and/or in accordance with different multi-antenna transmission modes (e.g., a single-antenna transmission mode, a multi-antenna multi-port transmission diversity mode, a multi-antenna single-port transmission diversity mode, and a multi-antenna multi-port spatial multiplexing mode).

The first physical layer format may have a same subframe length as, and a same multi-antenna transmission mode as or a different multi-antenna transmission mode from the second physical layer. In the embodiments of the present disclosure, a short subframe structure is mainly taken as an example.

In the case of a short subframe, the first physical layer format and the second physical layer format may each be, but not limited to, a slot-level TTI transmission format, or an OFDM-level TTI transmission format.

The third physical layer format may have a same subframe as a conventional subframe defined in the LTE Rel-14, e.g., an LTE normal subframe (1 ms). Of course, the subframe of the third physical layer format may not be limited thereto. In the embodiments of the present disclosure, the third physical layer format may also be called as a legacy physical layer format.

It should be appreciated that, the first physical layer format may be the same as or different from the second physical layer, and a communication protocol adapted to each of the first physical layer format and the second physical layer format may be provided with a version higher than a communication protocol adapted to the third physical layer format. In other words, the first physical layer format and the second physical layer format may be called as new physical layer formats, while the third physical layer format may be called as the legacy physical layer format.

In some possible embodiments of the present disclosure, the transmission method may further include determining, by the transmitting end device, whether the second SA information needs to be transmitted in the third physical layer format in accordance with a network configuration or a pre-configuration when transmitting the first SA information in the first physical layer format and transmitting the first data in the second physical layer format.

According to the network configuration or the pre-configuration, when a same V2X resource pool is shared by the first physical layer format and/or the second physical layer format (the new physical layer formats) used by the transmitting end device and the third physical layer format used by the receiving end device (the legacy physical layer format), the transmitting end device is configured to transmit the second SA information simultaneously with the first SA information and the first data, and the second SA information may be called as legacy SA information.

A time-frequency resource occupied by the first SA information may be included in a set of time-frequency resources for second data indicated in the second SA information. In some possible embodiments of the present disclosure, a frequency-domain resource occupied by the first SA information may be located at a head or a tail of frequency-domain resources for the second data indicated in the second SA information.

In the embodiments of the present disclosure, the first SA information may further include one or more of an MCS for the first data transmitted in the second physical layer format, indication information about a time-frequency resource of the first data, indication information about a redundancy version, indication information about a resource reservation period, and indication information about a service priority.

In the embodiments of the present disclosure, the indication information about the DMRS sequence may include information about a DMRS initialization ID, and/or indication information about a DMRS cyclic shift value.

In the embodiments of the present disclosure, when the transmitting end device transmits the first SA information in the first physical layer format, transmits the first data in the second physical layer format and transmits the second SA information in the third physical layer format, a DMRS sequence generated by the indication information about the DMRS sequence carried in the first SA information may be the same as a DMRS sequence generated by the indication information about the DRMS sequence carried in the second SA information.

It should be appreciated that, the indication information about the DMRS sequence carried in the second SA information may be determined in accordance with an ID generated by a CRC bit in the SA information, while the indication information about the DMRS sequence in the first SA information may be explicitly indicated in the SA information.

In the embodiments of the present disclosure, when the transmitting end device transmits the first SA information in the first physical layer format, transmits the first data in the second physical layer format and transmits the second SA information in the third physical layer format, a position of a time-frequency resource occupied by a DMRS sequence associated with the first data transmitted in the second physical layer format may be the same as a position of a time-frequency resource occupied by a DMRS sequence associated with the first data determined in accordance with the third physical layer format.

In the embodiments of the present disclosure, when the transmitting end device transmits the first SA information in the first physical layer format, transmits the first data in the second physical layer format and transmits the second SA information in the third physical layer format, a DMRS sequence associated with the first data transmitted in the second physical layer format may be the same as a DMRS sequence associated with the first data determined in accordance with the third physical layer format.

In the embodiments of the present disclosure, when the transmitting end device transmits the first SA information in the first physical layer format, transmits the first data in the second physical layer format and transmits the second SA information in the third physical layer format, and the time-frequency resource occupied by the first SA information is included in the set of the time-frequency resources of the second data indicated in the second SA information, the DMRS sequence for a portion overlapping the time-frequency resource occupied by the first SA information may be processed through a punching process to remove redundant bits.

In some possible embodiments of the present disclosure, the transmission method may further include generating, by the transmitting end device, a DMRS sequence transmitted in the second physical layer format in accordance with the indication information about the DMRS sequence in the first SA information. For example, a length of the DMRS sequence transmitted in the second physical layer format may be determined in accordance with the first SA information and a time-frequency resource occupied by the first data transmitted in the second physical layer format. The DMRS sequence for a portion overlapping a time-frequency resource occupied by the first SA information may be processed through a punching process to remove redundant bits.

According to the embodiments of the present disclosure, the first SA information transmitted by the transmitting end device may at least include the indication information about the DMRS sequence for the demodulation of the first data, so a receiving end device is capable of demodulating the first data in accordance with the indication information. As a result, it is able to improve the data transmission reliability and reduce the transmission delay. In addition, the first physical layer format for transmitting the first SA information and the second physical layer format for transmitting the first data may each be a transmission format supporting a shorter subframe length, e.g., a transmission format with a slot-level Transmission Time Interval (TTI) or an OFDM symbol-level TTI, so it is able to be adapted to an evolved V2X technique with a shorter processing delay and higher reliability.

Further, the transmitting end device may transmit the first SA information in the first physical layer format, transmit the first data in the second physical layer format, and transmit the second SA information in accordance with the third physical layer format. Hence, it is able to improve the data transmission reliability and reduce the transmission delay without affecting the sensing of the resources at the receiving end device.

Figure 7:
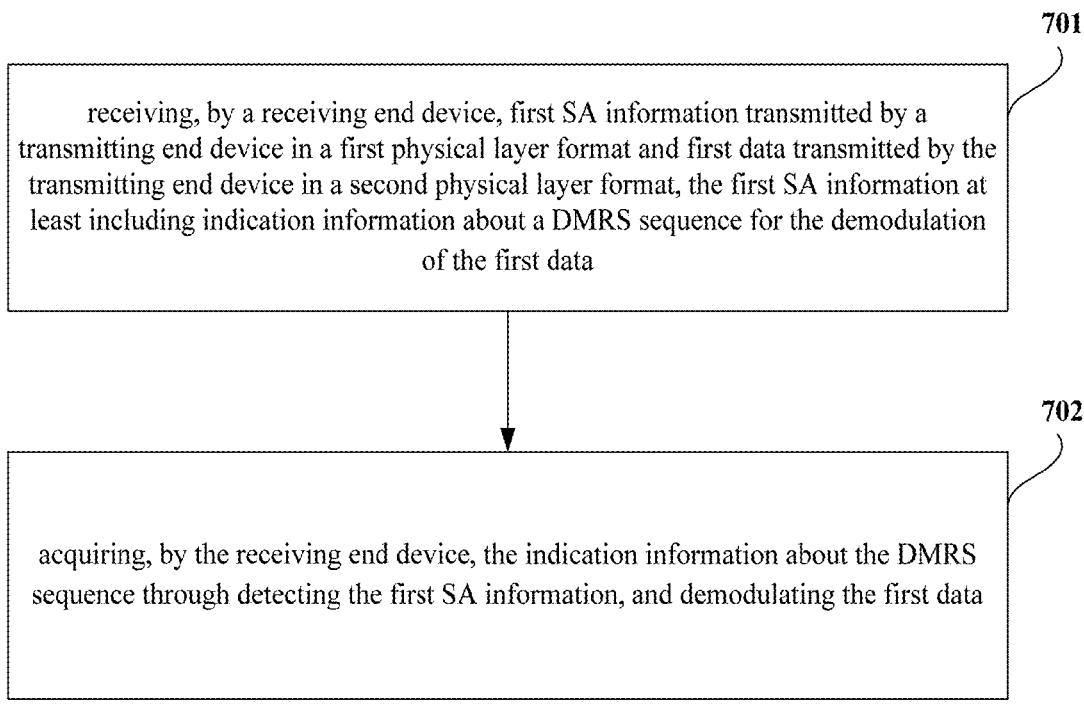
FIG. 7 is a flow chart of a transmission method according to some embodiments of the present disclosure.

The present disclosure further provides in some embodiments a transmission method which, as shown in FIG. 7, includes Step 701 and Step 702. However, it should be appreciated that, the transmission method may not be limited to these two steps.

Step 701: receiving, by a receiving end device, first SA information transmitted by a transmitting end device in a first physical layer format and first data transmitted by the transmitting end device in a second physical layer format, the first SA information at least including indication information about a DMRS sequence for the demodulation of the first data.

Step 702: acquiring, by the receiving end device, the indication information about the DMRS sequence through detecting the first SA information, and demodulating the first data.

In the embodiments of the present disclosure, the first SA information may further include one or more of an MCS for the first data transmitted in the second physical layer format, indication information about a time-frequency resource of the first data, indication information about a redundancy version, indication information about a resource reservation period, and indication information about a service priority.

In the embodiments of the present disclosure, the indication information about the DMRS sequence may include information about a DMRS initialization ID, and/or indication information about a DMRS cyclic shift value.

According to the embodiments of the present disclosure, the first SA information transmitted by the transmitting end device may at least include the indication information about the DMRS sequence for the demodulation of the first data, so a receiving end device is capable of demodulating the first data in accordance with the indication information. As a result, it is able to improve the data transmission reliability and reduce the transmission delay. In addition, the first physical layer format for transmitting the first SA information and the second physical layer format for transmitting the first data may each be a transmission format supporting a shorter subframe length, e.g., a transmission format with a slot-level Transmission Time Interval (TTI) or an OFDM symbol-level TTI, so it is able to be adapted to an evolved V2X technique with a shorter processing delay and higher reliability.

Further, the transmitting end device may transmit the first SA information in the first physical layer format, transmit the first data in the second physical layer format, and transmit the second SA information in accordance with the third physical layer format. Hence, it is able to improve the data transmission reliability and reduce the transmission delay without affecting the sensing of the resources at the receiving end device (a legacy UE).

Figure 8:
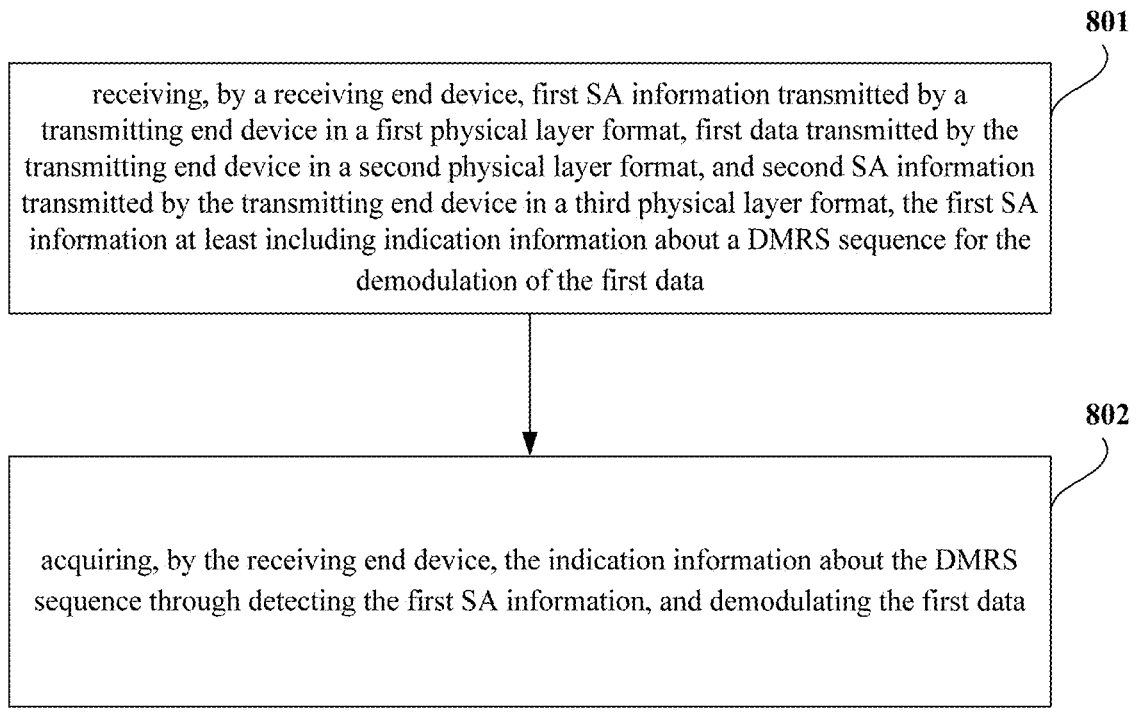
FIG. 8 is another flow chart of the transmission method according to some embodiments of the present disclosure.

The present disclosure further provides in some embodiments a transmission method which, as shown in FIG. 8, includes Step 801 and Step 802. However, it should be appreciated that, the transmission method may not be limited to these two steps.

Step 801: receiving, by a receiving end device, first SA information transmitted by a transmitting end device in a first physical layer format, first data transmitted by the transmitting end device in a second physical layer format, and second SA information transmitted by the transmitting end device in a third physical layer format, the first SA information at least including indication information about a DMRS sequence for the demodulation of the first data.

Step 802: acquiring, by the receiving end device, the indication information about the DMRS sequence through detecting the first SA information, and demodulating the first data.

In the embodiments of the present disclosure, a time-frequency resource occupied by the first SA information may be included in a set of time-frequency resources for second data indicated in the second SA information.

In the embodiments of the present disclosure, a frequency-domain resource occupied by the first SA information may be located at a head or a tail of frequency-domain resources for the second data indicated in the second SA information.

In the embodiments of the present disclosure, the first SA information may further include one or more of an MCS for the first data transmitted in the second physical layer format, indication information about a time-frequency resource of the first data, indication information about a redundancy version, indication information about a resource reservation period, and indication information about a service priority.

In the embodiments of the present disclosure, the indication information about the DMRS sequence may include information about a DMRS initialization ID, and/or indication information about a DMRS cyclic shift value.

In the embodiments of the present disclosure, a DMRS sequence generated by the indication information about the DMRS sequence carried in the first SA information may be the same as a DMRS sequence generated by the indication information about the DRMS sequence carried in the second SA information.

According to the embodiments of the present disclosure, the first SA information transmitted by the transmitting end device may at least include the indication information about the DMRS sequence for the demodulation of the first data, so a receiving end device is capable of demodulating the first data in accordance with the indication information. As a result, it is able to improve the data transmission reliability and reduce the transmission delay. In addition, the first physical layer format for transmitting the first SA information and the second physical layer format for transmitting the first data may each be a transmission format supporting a shorter subframe length, e.g., a transmission format with a slot-level Transmission Time Interval (TTI) or an OFDM symbol-level TTI, so it is able to be adapted to an evolved V2X technique with a shorter processing delay and higher reliability.

Further, the transmitting end device may transmit the first SA information in the first physical layer format, transmit the first data in the second physical layer format, and transmit the second SA information in accordance with the third physical layer format. Hence, it is able to improve the data transmission reliability and reduce the transmission delay without affecting the sensing of the resources at the receiving end device.

In some possible embodiments of the present disclosure, when the SA information and/or the data are transmitted by the transmitting end device (hereinafter referred to as new UE) in the first physical layer format (hereinafter referred to as new physical layer format, e.g., in the case of a short subframe, it may be a transmission format with a slot-level TTI or an OFDM symbol-level TTI, or a new transmission scheme), the first SA information (hereinafter referred to as new SA information) is transmitted certainly, while whether the second SA information (hereinafter referred to as legacy SA information) is to be transmitted may depend on the network configuration/pre-configuration. For example, a configuration criterion for the network will be described as follows.

1) When a same V2X resource pool is shared by the new physical layer format for the new UE and the second physical layer format (hereinafter referred to as legacy physical layer format) for a legacy UE, a system may configure or preconfigure the new UE to transmit the legacy SA information when transmitting the new SA information and the data. To be specific, the system may configure a set of resources for the legacy SA information and a set of resources for the new SA information. When both the set of resources for the legacy SA information and the set of resources for the new SA information have been configured by the system, the new UE needs to transmit the new SA information and the legacy SA information simultaneously. The new SA information needs to include one or more of an MCS for the data transmitted in the new physical layer format, indication information about the resources, and indication information about the DMRS sequence. The indication information about the DMRS sequence may include information about a DMRS initialization ID and indication information about a DMRS cyclic shift value.

2) When no same V2X resource pool is shared by the new physical layer format for the new UE and the legacy physical layer format for the legacy UE, the new UE merely needs to transmit the new SA information when transmitting the data in the new physical layer format. The new SA information needs to include one or more of the MCS for the data transmitted in the new physical layer format, the indication information about the resources, and the indication information about the DMRS sequence. The indication information about the DMRS sequence may include the information about the DMRS initialization ID and the indication information about the DMRS cyclic shift value.

For the new UE, it may receive the data in the new physical layer format always in accordance with the DMRS sequence indicated in the new SA information.

Figure 9:
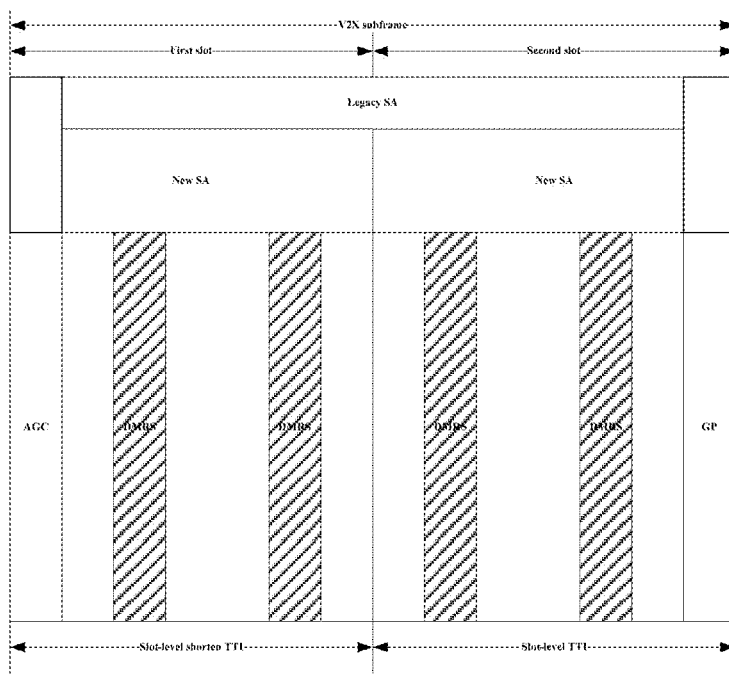
FIG. 9 is a schematic view showing a data transmission channel for a new V2X UE (also called as a new UE) according to some embodiments of the present disclosure.
Figure 10:
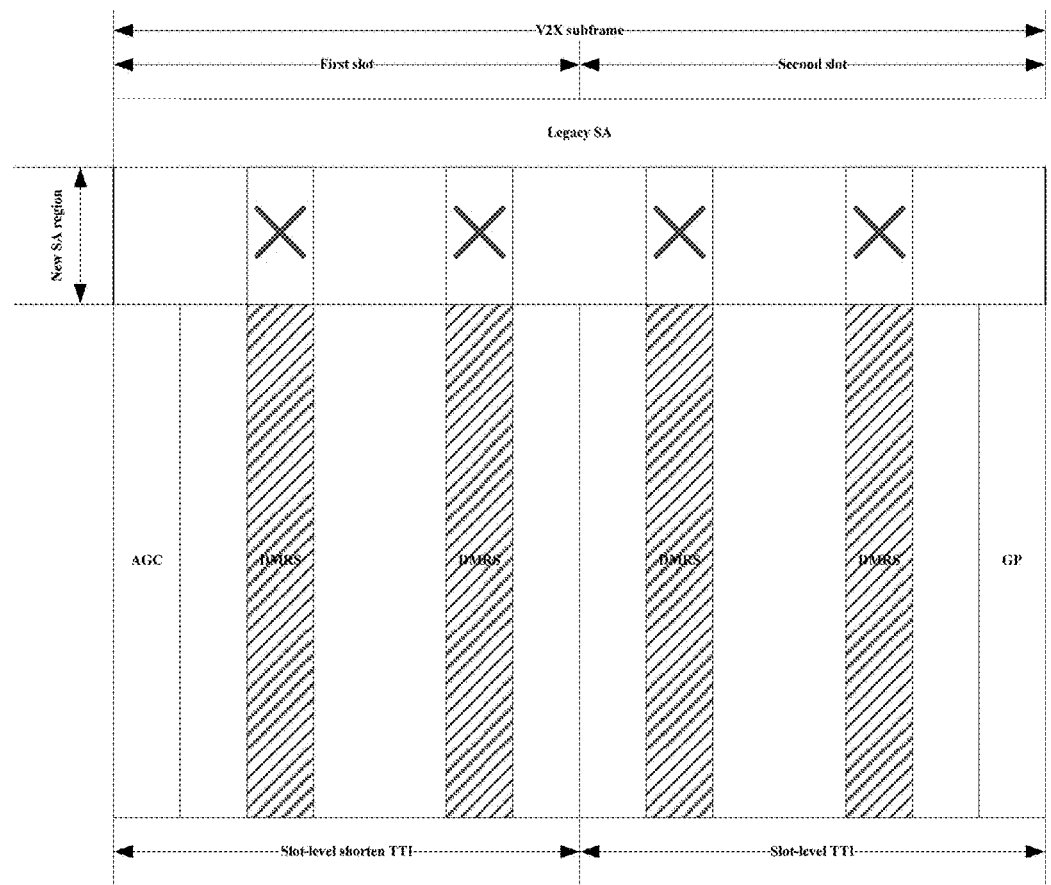
FIG. 10 is a schematic view showing a generation mode of a DMRS sequence for data in a new physical channel format according to some embodiments of the present disclosure.

When the same V2X resource pool is shared by the new physical layer format for the new UE and the legacy physical layer format for the legacy UE, FIGS. 9 and 10 show generation modes of the corresponding DMRSs for the new UE, which will be described as follows.

FIG. 9 shows a channel for the transmission of data by a new V2X UE (new UE). To be specific, the legacy SA information may be transmitted on the legacy SA resource, the new SA information may be transmitted in the new physical layer format on the new SA resource, and the data may be transmitted in the new physical layer format in accordance with the indication information in the new SA information. The new SA resource may be one of the data resources indicated in the legacy SA information. In some possible embodiments of the present disclosure, a position of the new SA resource may be adjacent to a position of the legacy SA resource in a frequency domain.

FIG. 10 shows a generation mode of the DMRS sequence for the data in the new physical layer format, which will be described as follows.

A position of the DMRS for the data in the new physical layer format may be the same as a position of an OFDM symbol occupied by the legacy DMRS.

The DMRS sequence for the data in the new physical layer format may be generated using a same method as the DMRS sequence for the legacy data. The DMRS sequence for the data (the data indicated in the legacy SA information) overlapping the new SA resource (a time-frequency resource occupied by the new SA information) may be processed through a punching process to remove redundant bits, i.e., the original DMRS sequence may be truncated.

The DMRS sequence for the new SA information in the new physical layer format may be generated using a predefined mode, so as to enable the receiving end device to detect the new SA information in accordance with the predefined DMRS.

The new SA information needs to include information about an initialization ID of the DMRS for the data in the new physical layer format, and this ID may be the same as the initialization ID of the DMRS determined in accordance with the CRC bit in the legacy SA information. Information about orthogonal extension of the DMRS will be acquired in the following two modes.

1) An implicit mode: in the case of a short subframe, the information about the orthogonal extension of the corresponding DMRS may be acquired after determining a DMRS symbol in a normal V2X subframe to which a DMRS symbol in a current subframe corresponds.

2) An explicit mode: the indication information about the orthogonal extension of the corresponding DMRS may be added in the new SA information.

The legacy UE may sense the resource occupation situation for the new UE as follows.

The legacy UE may detect the legacy SA information from the new UE, so as to acquire a position of a resource indicated in the legacy SA information. Then, the legacy UE may acquire DRMS ID information about a position of a resource for the data indicated in the legacy SA information in accordance with the CRC bit in the legacy SA information, and perform DMRS RSRP measurement in accordance with the acquired DMRS initialization ID information. In this case, it is equivalent to performing the RSRP measurement on the truncated DMRS. The quantity of PRBs occupied by the new SA information is far less than the resources occupied by the data from the new UE, so a measurement result may not be adversely affected seriously when the DMRS RSRP measurement is performed on the truncated DMRS.

As the receiving end device, the new UE may detect the new SA information, so as to acquire indication information about the resource for the data in the new physical layer format indicated in the new SA information, an MCS level, and relevant information about the DMRS sequence, thereby to detect the data.

Here, the new UE also needs to truncate the DMRS, i.e., a length of the DMRS sequence may be determined jointly in accordance with the new SA information and the resource for the data indicated in the new SA information. Then, the DMRS sequence corresponding to the resource occupied by the new SA information may be processed through a punching process to remove redundant bits.

In the embodiments of the present disclosure, the slot-level TTI has been taken an example. However, it should be appreciated that, the scheme in the embodiments of the present disclosure may also be directly applied to a V2X normal subframe or a shorter symbol-level TTI subframe.

Figure 11:
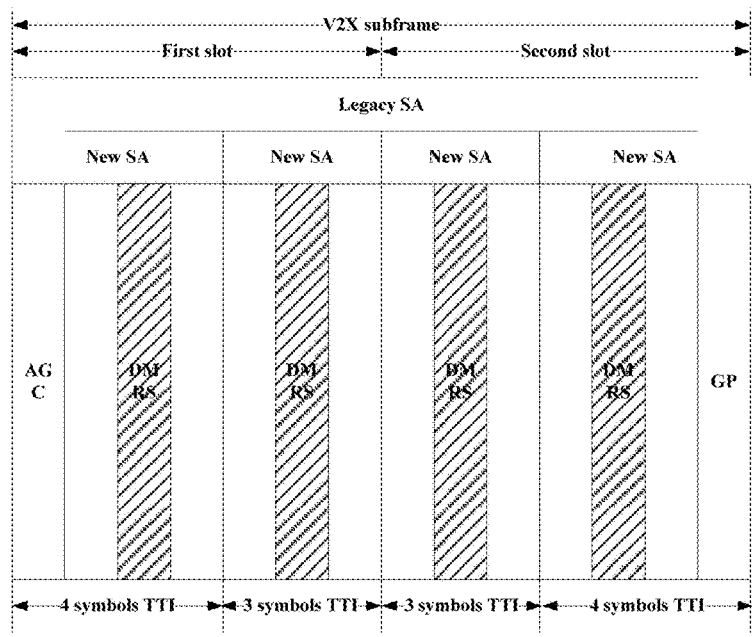
FIG. 11 is a schematic view showing a subframe with a symbol-level TTI according to some embodiments of the present disclosure.

Example 1: FIG. 11 shows a symbol-level TTI subframe, with AGC and GP being taken into consideration. One normal subframe may be divided into 4 short subframes, which occupy 4, 3, 3 and 4 OFDM symbols respectively.

Figure 12:
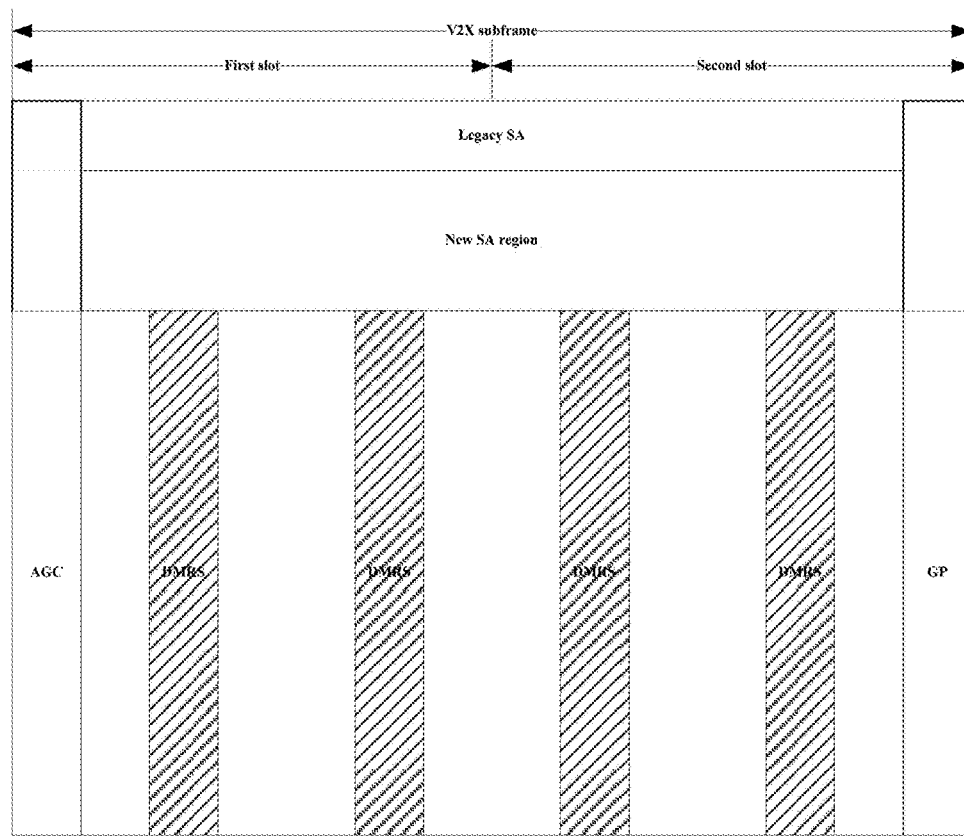
FIG. 12 is a schematic view showing a normal subframe according to some embodiments of the present disclosure.

Example 2: FIG. 12 shows the new physical layer format based on a normal subframe. A new SA region may be used for the new SA information using a new transmission scheme, or the new SA information incompatible with the legacy SA information.

Figure 13:
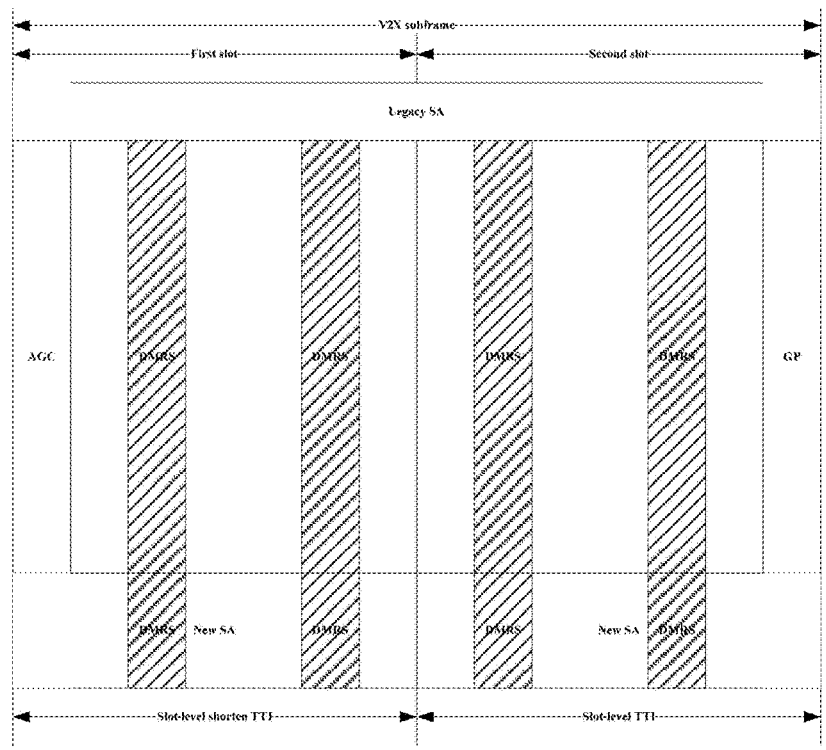
FIG. 13 is a schematic view showing a situation where new SA is located at a tail of frequency-domain resources for the data according to some embodiments of the present disclosure.

In the embodiments of the present disclosure, in a scenario where the new SA information and the legacy SA information coexist, a resource for the new SA information may be located at any position in the resources for the data. The above-mentioned method for truncating the DMRS may be applied. FIG. 13 shows an example where the new SA information is located at a tail of a frequency-domain resource for the data.

Figure 14A:
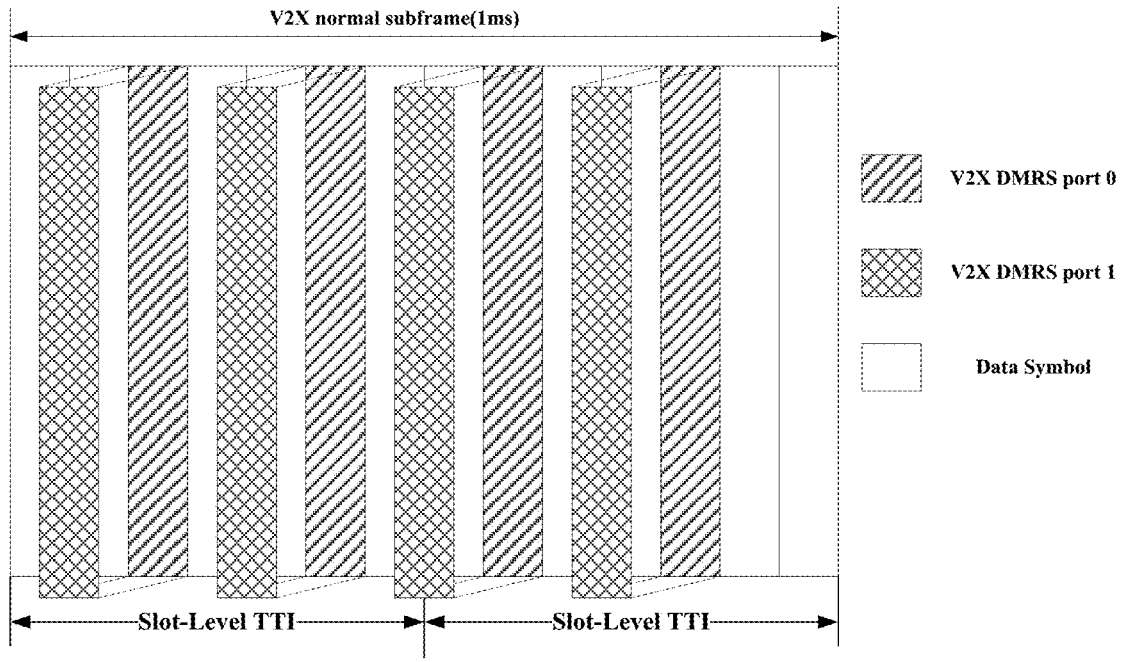
FIGS. 14A and 14B are schematic views of a DMRS with different sequences according to some embodiments of the present disclosure.
Figure 14B:
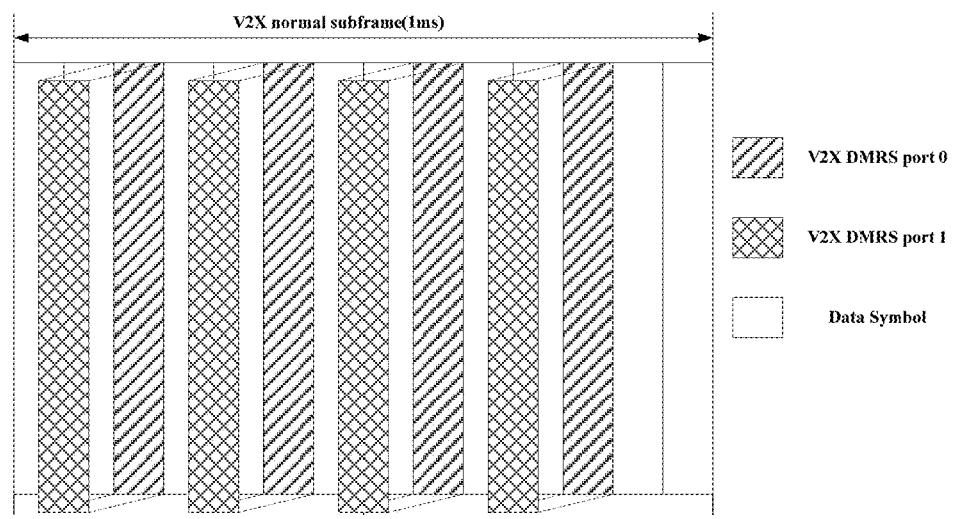

Example 3: a multi-antenna transmission diversity transmission mode, e.g., a 2-port transmission mode, may be adopted by the new UE so as to improve the transmission reliability, and the DMRSs may be differentiated from each other in accordance with different sequences, as shown in FIGS. 14A and 14B. The method mentioned in the embodiments of the present disclosure may be applied to a sequence generated for one DRMS port (e.g., a V2X DMRS port 0), so that the DMRS sequence for the DMRS port is a truncated legacy DMRS sequence.

Figure 19:
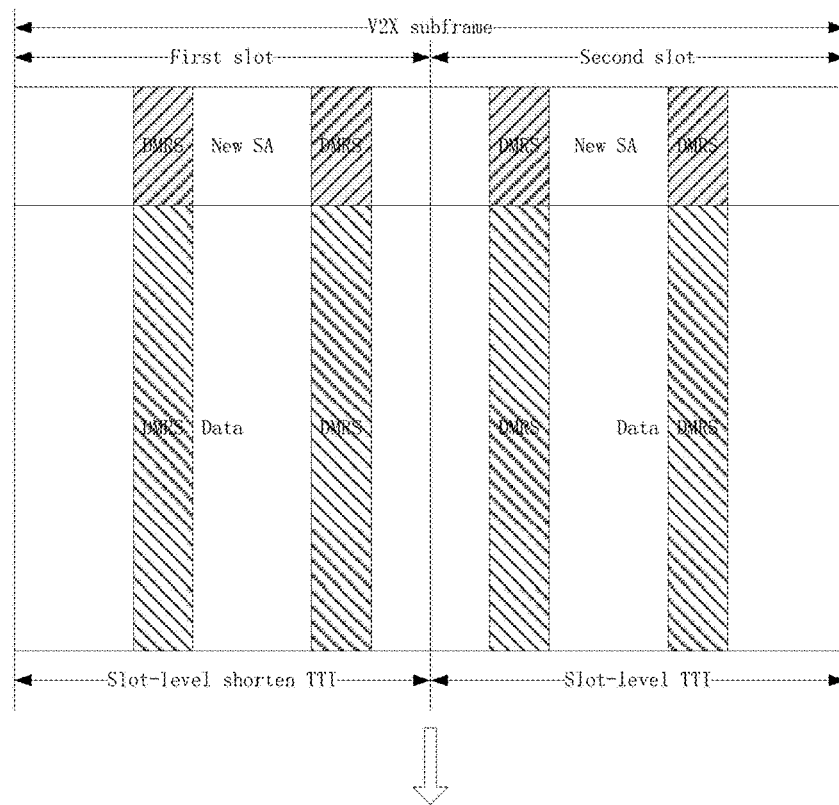
FIG. 19 is a schematic view showing a generation mode of the DMRS sequence according to some embodiments of the present disclosure.
Figure 19:
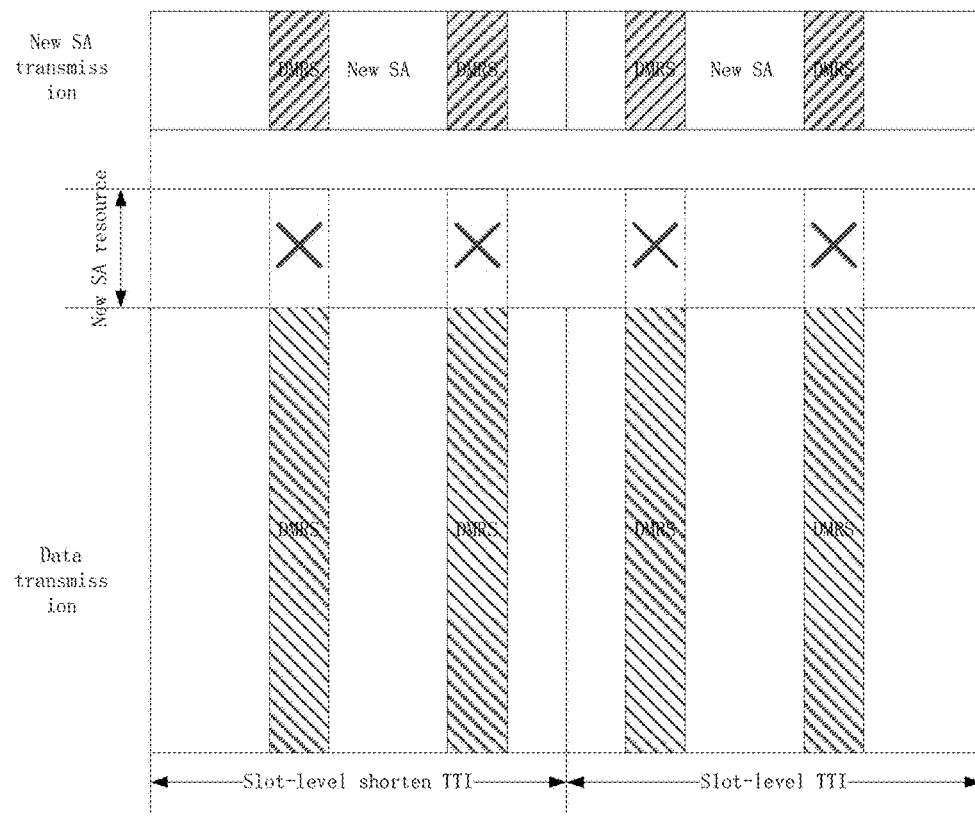

Example 4: during the transmission of the new SA information and the data, a DMRS sequence on a pilot symbol for the data may be determined in accordance with the indication information about the DMRS sequence carried in the SA information. FIG. 19 shows a generation mode of the DMRS sequence. A length of the DMRS sequence may be determined in accordance with the time-frequency resources occupied by the SA information and the data, and the DRMS sequence for the data overlapping the time-frequency resource occupied by the SA information may be processed through a punching process to remove redundant bits, i.e., it is equivalent to truncating the generated DMRS sequence.

Based on a same inventive concept, the present disclosure further provides in some embodiments a transmission device. A principle for solving the problem is similar to that of the transmission method in FIGS. 5 and 6, so the implementation of the transmission device may refer to that of the transmission method mentioned hereinabove, which will not be particularly defined herein.

Figure 15:
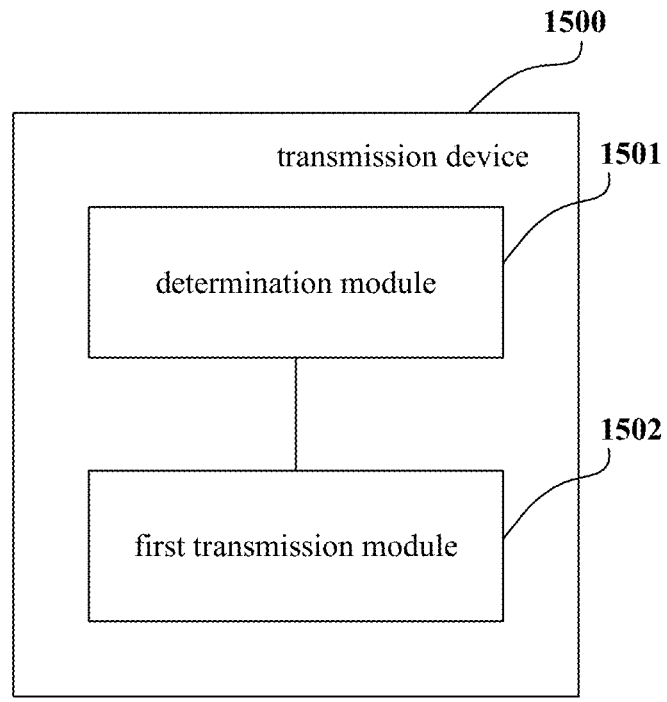
FIG. 15 is a schematic view showing a transmission device according to some embodiments of the present disclosure.

As shown in FIG. 15, the present disclosure provides in some embodiments a transmission device 1500 which includes: a determination module 1501 configured to determine first SA information and first data to be transmitted, the first SA information at least including indication information about a DMRS sequence for the demodulation of the first data; and a first transmission module 1502 configured to transmit the first SA information in a first physical layer format and transmit the first data in a second physical layer format.

In the embodiments of the present disclosure, the transmission device may further include a second transmission module configured to transmit second SA information in a third physical layer format when transmitting the first SA information in the first physical layer format and transmitting the first data in the second physical layer format.

In the embodiments of the present disclosure, the transmission device may further include a judgment module configured to determine whether the second SA information needs to be transmitted in the third physical layer format in accordance with a network configuration or a pre-configuration when transmitting the first SA information in the first physical layer format and transmitting the first data in the second physical layer format.

In the embodiments of the present disclosure, a time-frequency resource occupied by the first SA information may be included in a set of time-frequency resources for second data indicated in the second SA information.

In the embodiments of the present disclosure, a frequency-domain resource occupied by the first SA information may be located at a head or a tail of the frequency-domain resources of the second data indicated in the second SA information.

In the embodiments of the present disclosure, a time-frequency resource occupied by the first SA information and a time-frequency resource occupied by the first data indicated in the first SA information may be both included in a set of time-frequency resources of the second data indicated in the second SA information.

In the embodiments of the present disclosure, the first SA information may further include one or more of an MCS for the first data transmitted in the second physical layer format, indication information about a time-frequency resource of the first data, indication information about a redundancy version, indication information about a resource reservation period, and indication information about a service priority.

In the embodiments of the present disclosure, the indication information about the DMRS sequence may include information about a DMRS initialization ID, and/or indication information about a DMRS cyclic shift value.

In the embodiments of the present disclosure, a DMRS sequence generated by the indication information about the DMRS sequence carried in the first SA information may be the same as a DMRS sequence generated by the indication information about the DRMS sequence carried in the second SA information.

In the embodiments of the present disclosure, a position of a time-frequency resource occupied by a DMRS sequence associated with the first data transmitted in the second physical layer format may be the same as a position of a time-frequency resource occupied by a DMRS sequence associated with the first data determined in accordance with the third physical layer format.

In the embodiments of the present disclosure, a DMRS sequence associated with the first data transmitted in the second physical layer format may be the same as a DMRS sequence associated with the first data determined in accordance with the third physical layer format.

In the embodiments of the present disclosure, the DMRS sequence for a portion overlapping the time-frequency resource occupied by the first SA information may be processed through a punching process to remove redundant bits.

In the embodiments of the present disclosure, the transmission device may further include a generation module (not shown) configured to generate a DMRS sequence transmitted in the second physical layer format in accordance with the indication information about the DMRS sequence in the first SA information. For example, a length of the DMRS sequence transmitted in the second physical layer format may be determined in accordance with the first SA information and the time-frequency resource occupied by the first data transmitted in the second physical layer format. The DMRS sequence for a portion overlapping the time-frequency resource occupied by the first SA information may be processed through a punching process to remove redundant bits.

Based on a same inventive concept, the present disclosure further provides in some embodiments a transmission device. A principle for solving the problem is similar to that of the transmission method in FIGS. 7 and 8, so the implementation of the transmission device may refer to that of the transmission method mentioned hereinabove, which will not be particularly defined herein.

Figure 16:
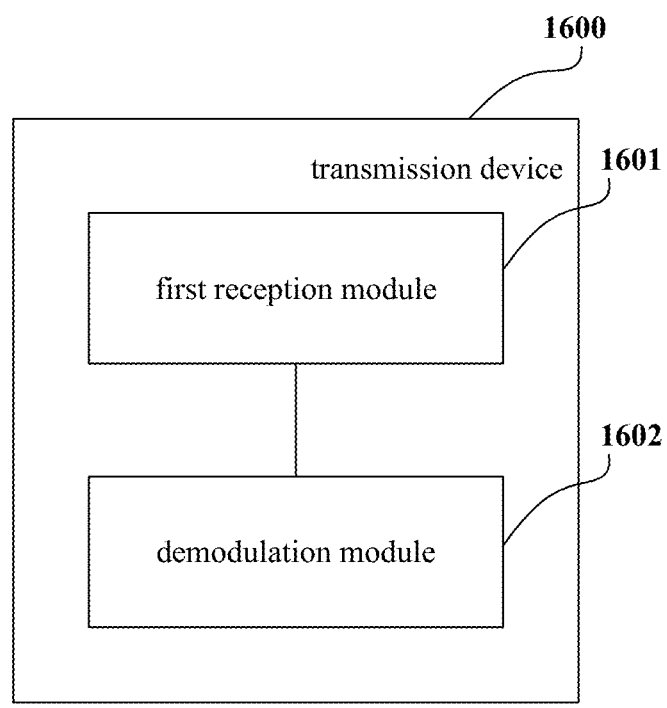
FIG. 16 is a schematic view showing a transmission device according to some embodiments of the present disclosure.

As shown in FIG. 16, the present disclosure further provides in some embodiments a transmission device 1600 which includes: a first reception module 1601 configured to receive first SA information transmitted by a transmitting end device in a first physical layer format and first data transmitted by the transmitting end device in a second physical layer format, the first SA information at least including indication information about a DMRS sequence for the demodulation of the first data; and a demodulation module 1602 configured to acquire the indication information about the DMRS sequence through detecting the first SA information, and demodulate the first data.

In the embodiments of the present disclosure, the transmission device may further include a second reception module configured to receive second SA information transmitted by the transmitting end device in a third physical layer format when the first reception module receives the first SA information transmitted by the transmitting end device in the first physical layer format and receives the first data transmitted by the transmitting end device in the second physical layer format.

In the embodiments of the present disclosure, a time-frequency resource occupied by the first SA information may be included in a set of time-frequency resources for second data indicated in the second SA information.

In the embodiments of the present disclosure, a frequency-domain resource occupied by the first SA information may be located at a head or a tail of the frequency-domain resources of the second data indicated in the second SA information.

In the embodiments of the present disclosure, the first SA information may further include one or more of an MCS for the first data transmitted in the second physical layer format, indication information about a time-frequency resource of the first data, indication information about a redundancy version, indication information about a resource reservation period, and indication information about a service priority.

In the embodiments of the present disclosure, the indication information about the DMRS sequence may include information about a DMRS initialization ID, and/or indication information about a DMRS cyclic shift value.

In the embodiments of the present disclosure, a DMRS sequence generated by the indication information about the DMRS sequence carried in the first SA information may be the same as a DMRS sequence generated by the indication information about the DRMS sequence carried in the second SA information.

The present disclosure further provides in some embodiments a transmitting end device which includes a first memory, a first processor, and a computer program stored in the first memory and executed by the first processor. The first processor is configured to execute the computer program, so as to implement the transmission method in FIG. 5 or FIG. 6.

Figure 17:
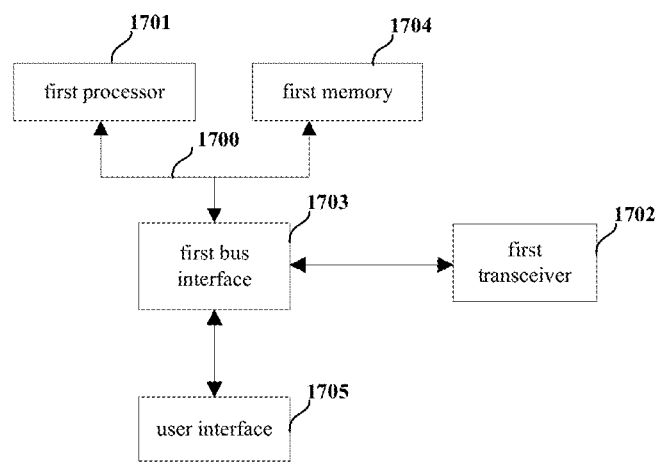
FIG. 17 is a schematic view showing a transmitting end device according to some embodiments of the present disclosure.

As shown in FIG. 17, the present disclosure further provides in some embodiments a transmitting end device, which includes a first memory, a first processor, and a computer program stored in the first memory and executed by the first processor. The first processor is configured to execute the computer program, so as to: determine first SA information and first data to be transmitted, the first SA information at least including indication information about a DMRS sequence for the demodulation of the first data; and transmit the first SA information in a first physical layer format and transmit the first data in a second physical layer format.

In FIG. 17, bus architecture (represented by a first bus 1700) may include a number of buses and bridges connected to each other, so as to connect various circuits for one or more processors 1701 and one or more memories 1704. In addition, as is known in the art, the first bus 1700 may be used to connect any other circuits, such as a circuit for a peripheral device, a circuit for a voltage stabilizer and a power management circuit. A first bus interface 1703 may be provided between the first bus 1700 and a first transceiver 1702, and the first transceiver 1702 may consist of one or more elements, i.e., a transmitter and a receiver for communication with any other devices over a transmission medium. For example, the first transceiver 1702 may receive data from the other devices, and transmit the data processed by the first processor 1701 to the other devices. Depending on properties of a computer system, a user interface 1705 may also be provided, such as a keypad, a display, a speaker, a microphone and a joystick. The first processor 1701 may take charge of managing the first bus 1700 as well general processings, e.g., running a general-purpose operating system. The first memory 1704 may store data therein for the operation of the first processor 1701.

In some possible embodiments of the present disclosure, the first processor 1701 may be a Central Processing Unit (CPU), an Application Specific Integrated Circuit (ASIC), a Field-Programmable Gate Array (FPGA) or a Complex Programmable Logic Device (CPLD).

In the embodiments of the present disclosure, the first processor 1701 is further configured to transmit second SA information in a third physical layer format when transmitting the first SA information in the first physical layer format and transmitting the first data in the second physical layer format.

In the embodiments of the present disclosure, a time-frequency resource occupied by the first SA information may be included in a set of time-frequency resources for second data indicated in the second SA information.

In the embodiments of the present disclosure, a frequency-domain resource occupied by the first SA information may be located at a head or a tail of the frequency-domain resources of the second data indicated in the second SA information.

In the embodiments of the present disclosure, the first SA information may further include one or more of an MCS for the first data transmitted in the second physical layer format, indication information about a time-frequency resource of the first data, indication information about a redundancy version, indication information about a resource reservation period, and indication information about a service priority.

In the embodiments of the present disclosure, the indication information about the DMRS sequence may include information about a DMRS initialization ID, and/or indication information about a DMRS cyclic shift value.

In the embodiments of the present disclosure, a DMRS sequence generated by the indication information about the DMRS sequence carried in the first SA information may be the same as a DMRS sequence generated by the indication information about the DRMS sequence carried in the second SA information.

In the embodiments of the present disclosure, a position of a time-frequency resource occupied by a DMRS sequence associated with the first data transmitted in the second physical layer format may be the same as a position of a time-frequency resource occupied by a DMRS sequence associated with the first data determined in accordance with the third physical layer format.

In the embodiments of the present disclosure, a DMRS sequence associated with the first data transmitted in the second physical layer format may be the same as a DMRS sequence associated with the first data determined in accordance with the third physical layer format.

In the embodiments of the present disclosure, the DMRS sequence for a portion overlapping the time-frequency resource occupied by the first SA information may be processed through a punching process to remove redundant bits.

The present disclosure further provides in some embodiments a receiving end device which includes a second memory, a second processor, and a computer program stored in the second memory and executed by the second processor. The second processor is configured to execute the computer program so as to implement the transmission method in FIG. 7 or FIG. 8.

Figure 18:
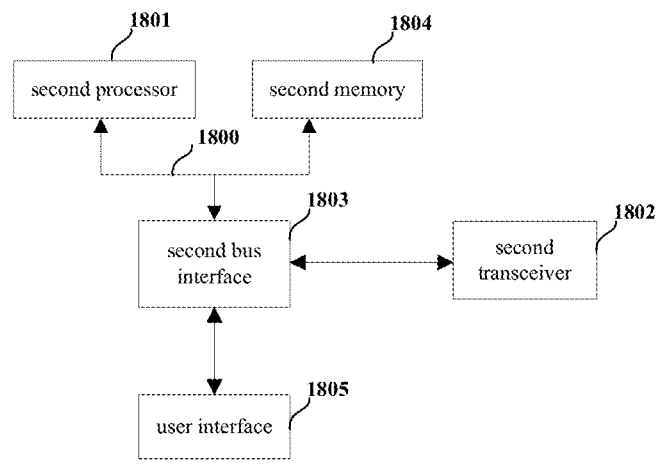
FIG. 18 is a schematic view showing a receiving end device according to some embodiments of the present disclosure.

As shown in FIG. 18, the present disclosure further provides in some embodiments a receiving end device, which includes a second memory, a second processor, and a computer program stored in the second memory and executed by the second processor. The second processor is configured to: receive first SA information transmitted by a transmitting end device in a first physical layer format and first data transmitted by the transmitting end device in a second physical layer format, the first SA information at least including indication information about a DMRS sequence for the demodulation of the first data; and acquire the indication information about the DMRS sequence through detecting the first SA information, and demodulate the first data.

In FIG. 18, bus architecture (represented by a second bus 1800) may include a number of buses and bridges connected to each other, so as to connect various circuits for one or more processors 1801 and one or more memories 1804. In addition, as is known in the art, the second bus 1800 may be used to connect any other circuits, such as a circuit for a peripheral device, a circuit for a voltage stabilizer and a power management circuit. A second bus interface 1803 may be provided between the first bus 1800 and a second transceiver 1802, and the second transceiver 1802 may consist of one or more elements, i.e., a transmitter and a receiver for communication with any other devices over a transmission medium. For example, the second transceiver 1802 may receive data from the other devices, and transmit the data processed by the second processor 1801 to the other devices. Depending on properties of a computer system, a user interface 1805 may also be provided, such as a keypad, a display, a speaker, a microphone and a joystick. The second processor 1801 may take charge of managing the second bus 1800 as well general processings, e.g., running a general-purpose operating system. The second memory 1804 may store data therein for the operation of the second processor 1801.

In some possible embodiments of the present disclosure, the second processor 1801 may be a CPU, an ASIC, an FPGA or a CPLD.

In the embodiments of the present disclosure, the second processor 1801 is further configured to receive second SA information transmitted by the transmitting end device in a third physical layer format when the first reception module receives the first SA information transmitted by the transmitting end device in the first physical layer format and receives the first data transmitted by the transmitting end device in the second physical layer format.

In some possible embodiments of the present disclosure, a time-frequency resource occupied by the first SA information may be included in a set of time-frequency resources for second data indicated in the second SA information.

In some possible embodiments of the present disclosure, a frequency-domain resource occupied by the first SA information may be located at a head or a tail of the frequency-domain resources of the second data indicated in the second SA information.

In some possible embodiments of the present disclosure, the first SA information may further include one or more of an MCS for the first data transmitted in the second physical layer format, indication information about a time-frequency resource of the first data, indication information about a redundancy version, indication information about a resource reservation period, and indication information about a service priority.

In some possible embodiments of the present disclosure, the indication information about the DMRS sequence may include information about a DMRS initialization ID, and/or indication information about a DMRS cyclic shift value.

In some possible embodiments of the present disclosure, a DMRS sequence generated by the indication information about the DMRS sequence carried in the first SA information may be the same as a DMRS sequence generated by the indication information about the DRMS sequence carried in the second SA information.

The present disclosure further provides in some embodiments a computer-readable storage medium storing therein a computer program (instruction). The computer program (instruction) is executed by a processor so as to implement the transmission method in FIG. 5 or FIG. 6.

The present disclosure further provides in some embodiments a computer-readable storage medium storing therein a computer program (instruction). The computer program (instruction) is executed by a processor so as to implement the transmission method in FIG. 7 or FIG. 8.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, the following serial numbers do not refer to the order of the steps. Actually, the order shall be determined in accordance with functions and internal logic of the steps, but shall not be construed as limiting the implementation in any form.

In addition, the terms "system" and "network" may be replaced with each other.

It should be further appreciated that, the expression "and/or" is merely used to describe the relationship between objects, and it includes three relationships. For example, "A and/or B" may represent that, there is only A, there are both A and B, and there is only B. Further, the symbol "/" usually refers to "or".

It should be further appreciated that, the expression "B corresponding to A" means that B is related to A and may be determined in accordance with A. It should be further appreciated that, in the case that B is determined in accordance with A, it means that B may be determined in accordance with A and/or any other information.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transmission method, comprising:
   determining, by a transmitting end device, first Scheduling Assignment (SA) information and first data, the first SA information at least comprising first indication information about a Demodulation Reference Signal (DMRS) sequence for the demodulation of the first data;
   transmitting, by the transmitting end device, the first SA information in accordance with a first physical layer format and transmitting the first data in accordance with a second physical layer format; and
   transmitting, by the transmitting end device, second SA information in accordance with a third physical layer format,
   wherein the first physical layer format and the second physical layer format is differentiated from each other (i) accordance with different multi-antenna transmission modes; or (ii) in accordance with a length of a subframe and different multi-antenna transmission modes.

2. The transmission method according to claim 1, further comprising:
   determining, by the transmitting end device, whether the second SA information needs to be transmitted in accordance with the third physical layer format in accordance with a network configuration or a pre-configuration when transmitting the first SA information in the first physical layer format and transmitting the first data in accordance with the second physical layer format.

3. The transmission method according to claim 1, wherein a time-frequency resource occupied by the first SA information is comprised in a set of time-frequency resources for second data indicated by the second SA information.

4. The transmission method according to claim 1, wherein the first SA information further comprises at least one of: a Modulation and Coding Scheme (MCS) for the first data, second indication information about a time-frequency resource of the first data, third indication information about a redundancy version, fourth indication information about a resource reservation period, and fifth indication information about a service priority.

5. The transmission method according to claim 1, wherein a DMRS sequence generated by the indication information about the DMRS sequence carried in the first SA information is the same as a DMRS sequence generated by the indication information about the DRMS sequence carried in the second SA information; or
- wherein a position of a time-frequency resource occupied by a DMRS sequence associated with the first data transmitted by the transmitting end device in accordance with the second physical layer format is the same as a position of a time-frequency resource occupied by a DMRS sequence associated with the first data determined in accordance with the third physical layer format; or
- a DMRS sequence associated with the first data transmitted by the transmitting end device in accordance with the second physical layer format is the same as a DMRS sequence associated with the first data determined in accordance with the third physical layer format.

6. The transmission method according to claim 1, further comprising:
- generating, by the transmitting end device, a DMRS sequence transmitted in accordance with the second physical layer format in accordance with the indication information about the DMRS sequence comprised in the first SA information.

7. The transmission method according to claim 6, wherein a length of the DMRS sequence transmitted in accordance with the second physical layer format is determined in accordance with the first SA information and the time-frequency resource occupied by the first data transmitted in accordance with the second physical layer format; and
- the DMRS sequence for a portion overlapping the time-frequency resource occupied by the first SA information is processed through a punching process.

8. A non-transitory computer-readable storage medium storing therein a computer program, wherein the computer program is executed by a processor so as to implement the transmission method according to claim 1.

9. A transmission method, comprising:
- receiving, by a receiving end device, first Scheduling Assignment (SA) information transmitted by a transmitting end device in accordance with a first physical layer format and first data transmitted by the transmitting end device in accordance with a second physical layer format, the first SA information at least comprising first indication information about a Demodulation Reference Signal (DMRS) sequence for the demodulation of the first data;
- acquiring, by the receiving end device, the first indication information about the DMRS sequence through detecting the first SA information, and demodulating the first data; and
- receiving, by the receiving end device, second SA information transmitted by the transmitting end device in accordance with a third physical layer format,
- wherein the first physical layer format and the second physical layer format is differentiated from each other (i) in accordance with different multi-antenna transmission modes; or (ii) in accordance with a length of a subframe and different multi-antenna transmission modes.

10. The transmission method according to claim 9, wherein a time-frequency resource occupied by the first SA information is comprised in a set of time-frequency resources for second data indicated by the second SA information.

11. The transmission method according to claim 9, wherein the first SA information further comprises at least one of: a Modulation and Coding Scheme (MCS) for the first data, second indication information about a time-frequency resource of the first data, third indication information about a redundancy version, fourth indication information about a resource reservation period, and fifth indication information about a service priority.

12. The transmission method according to claim 9, wherein a DMRS sequence generated by the indication information about the DMRS sequence carried in the first SA information is the same as a DMRS sequence generated by the indication information about the DRMS sequence carried in the second SA information.

13. A receiving end device, comprising a processor, a memory, and a computer program stored in the memory and executed by the processor, wherein the processor is configured to execute the computer program so as to implement the transmission method according to claim 9.

14. A non-transitory computer-readable storage medium storing therein a computer program, wherein the computer program is executed by a processor so as to implement the transmission method according to claim 9.

15. The transmission method according to claim 9, wherein a DMRS sequence generated by the indication information about the DMRS sequence carried in the first SA information is the same as a DMRS sequence generated by the indication information about the DRMS sequence carried in the second SA information; or
- wherein a position of a time-frequency resource occupied by a DMRS sequence associated with the first data transmitted by the transmitting end device in accordance with the second physical layer format is the same as a position of a time-frequency resource occupied by a DMRS sequence associated with the first data determined in accordance with the third physical layer format; or
- wherein a DMRS sequence associated with the first data transmitted by the transmitting end device in accordance with the second physical layer format is the same as a DMRS sequence associated with the first data determined in accordance with the third physical layer format.

16. The transmission method according to claim 9, further comprising:
- receiving, by the receiving end device, a DMRS sequence transmitted in accordance with the second physical layer format in accordance with the indication information about the DMRS sequence in the first SA information generated by the transmitting end device.

17. The transmission method according to claim 16, wherein a length of the DMRS sequence transmitted in accordance with the second physical layer format is determined in accordance with the first SA information and the time-frequency resource occupied by the first data transmitted in accordance with the second physical layer format; and
- the DMRS sequence for a portion overlapping the time-frequency resource occupied by the first SA information is processed through a punching process.

18. A transmitting end device, comprising a processor, a memory, and a computer program stored in the memory and executed by the processor, wherein the processor is configured to execute the computer program so as to implement a transmission method, comprising:
- determining, by the transmitting end device, first Scheduling Assignment (SA) information and first data, the first SA information at least comprising first indication information about a Demodulation Reference Signal (DMRS) sequence for the demodulation of the first data;
- transmitting, by the transmitting end device, the first SA information in accordance with a first physical layer format and transmitting the first data in accordance with a second physical layer format; and
- transmitting, by the transmitting end device, second SA information in accordance with a third physical layer format,
- wherein the first physical layer format and the second physical layer format is differentiated from each other (i) in accordance with different multi-antenna transmission modes; or (ii) in accordance with a length of a subframe and different multi-antenna transmission modes.

* * * * *